United States Patent
Suzuki et al.

(10) Patent No.: US 8,330,868 B2
(45) Date of Patent: Dec. 11, 2012

(54) IMAGE PROCESSING APPARATUS

(75) Inventors: Takahiro Suzuki, Tokyo (JP);
Masahiko Kato, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 237 days.

(21) Appl. No.: 12/716,827

(22) Filed: Mar. 3, 2010

(65) Prior Publication Data
US 2010/0303375 A1 Dec. 2, 2010

(30) Foreign Application Priority Data
May 29, 2009 (JP) ................................ P2009-131562

(51) Int. Cl.
*H04N 5/00* (2011.01)
*H04N 5/21* (2006.01)

(52) U.S. Cl. ......... 348/607; 348/625; 348/623; 348/627
(58) Field of Classification Search .................. 348/607, 348/625, 623, 627
See application file for complete search history.

(56) References Cited

U.S. PATENT DOCUMENTS

| | | | | |
|---|---|---|---|---|
| 5,093,721 | A * | 3/1992 | Rabii ............................. | 348/448 |
| 5,260,791 | A * | 11/1993 | Lubin ............................ | 348/623 |
| 5,703,968 | A * | 12/1997 | Kuwahara et al. ............. | 382/269 |
| 6,618,097 | B1 * | 9/2003 | Yamada ......................... | 348/625 |
| 6,870,515 | B2 * | 3/2005 | Kitchener et al. ............. | 343/853 |
| 7,031,551 | B2 * | 4/2006 | Yano et al. .................... | 382/275 |
| 7,212,686 | B2 * | 5/2007 | Someya et al. ................ | 382/263 |
| 7,599,572 | B2 * | 10/2009 | Shekter ......................... | 382/272 |
| 7,782,401 | B1 * | 8/2010 | Chou ............................. | 348/581 |
| 7,782,403 | B2 * | 8/2010 | Kubota ......................... | 348/607 |
| 7,957,606 | B2 * | 6/2011 | Schoner ........................ | 382/263 |
| 8,031,956 | B2 * | 10/2011 | Ali ................................ | 382/240 |
| 8,098,308 | B2 * | 1/2012 | Aragaki et al. ............... | 348/280 |
| 8,145,006 | B2 * | 3/2012 | Muto ............................ | 382/263 |
| 2002/0034337 | A1 * | 3/2002 | Shekter ......................... | 382/275 |
| 2005/0012866 | A1 * | 1/2005 | Chiang et al. ................. | 348/625 |
| 2005/0128358 | A1 * | 6/2005 | Nakajima et al. ............. | 348/678 |
| 2006/0093232 | A1 * | 5/2006 | Yang et al. .................... | 382/254 |
| 2006/0285766 | A1 * | 12/2006 | Ali ................................ | 382/263 |

(Continued)

FOREIGN PATENT DOCUMENTS
JP 04-319872 11/1992
(Continued)

OTHER PUBLICATIONS

Japanese Office Action for Japanese Application No. 2009-131562 dated Oct. 10, 2012.

*Primary Examiner* — Brian Yenke
(74) *Attorney, Agent, or Firm* — Turocy & Watson, LLP

(57) ABSTRACT

An image quality adjusting circuit in an image processing apparatus is provided with a line memory unit, a delay circuit unit, a first to fourth filter processing circuits, and an adder. In the delay circuit unit, delay circuits are arranged in a matrix form. Delay circuits arranged in a horizontal direction receive an image data directly or via line memories. The image quality adjusting circuit each perform filter processing on the received image data signals lying in a horizontal direction, in a vertical direction, in a down-right direction, and in a down-left direction. The image quality adjusting circuit performs addition of the image data on a focus pixel and the filter-processed data, and thus performs edge correction processing.

4 Claims, 34 Drawing Sheets

U.S. PATENT DOCUMENTS

| | | | |
|---|---|---|---|
| 2007/0098295 A1* | 5/2007 | Wu | 382/266 |
| 2007/0287218 A1* | 12/2007 | Smith | 438/78 |
| 2008/0019606 A1* | 1/2008 | Schoner | 382/263 |
| 2009/0060370 A1* | 3/2009 | Pedersen | 382/261 |
| 2009/0135278 A1* | 5/2009 | Aragaki et al. | 348/242 |
| 2009/0180030 A1* | 7/2009 | Shin et al. | 348/663 |
| 2010/0188582 A1* | 7/2010 | Hsu | 348/607 |
| 2010/0259650 A1* | 10/2010 | Sasaki | 348/241 |
| 2011/0002539 A1* | 1/2011 | Fukutomi | 382/167 |
| 2011/0141368 A1* | 6/2011 | Wallace et al. | 348/606 |

FOREIGN PATENT DOCUMENTS

| | | |
|---|---|---|
| JP | 11-261848 | 9/1999 |
| JP | 2004-213415 | 7/2004 |
| JP | 2006-304352 | 11/2006 |
| JP | 2007-208399 | 8/2007 |

* cited by examiner

| tap | T1 | T2 | T3 | T4 | T5 |
|---|---|---|---|---|---|
| factor | 1/16 | 1/8 | 1/4 | 1/8 | 1/16 |

FIG. 7

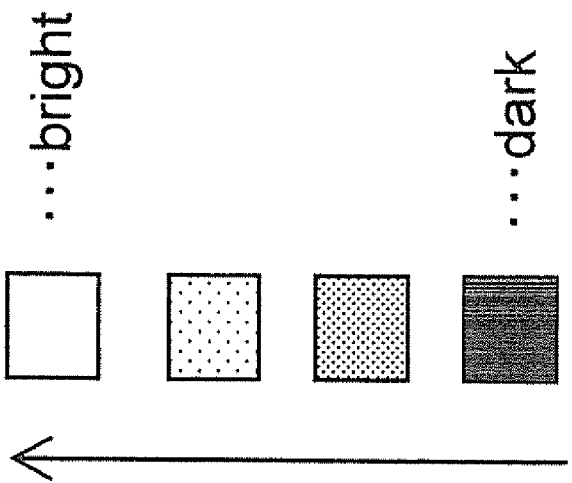
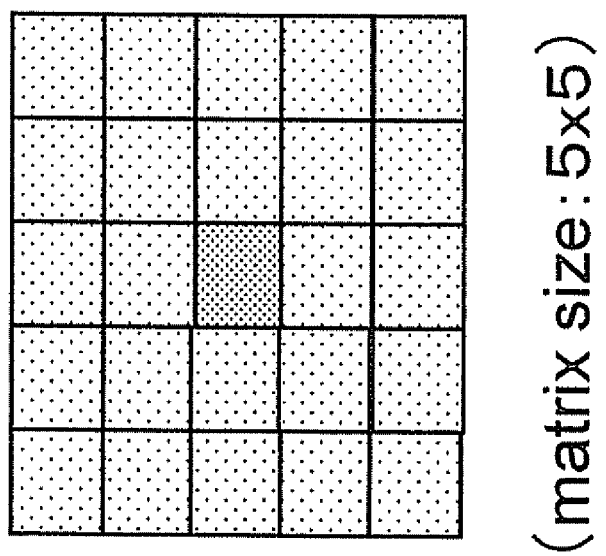
FIG.9

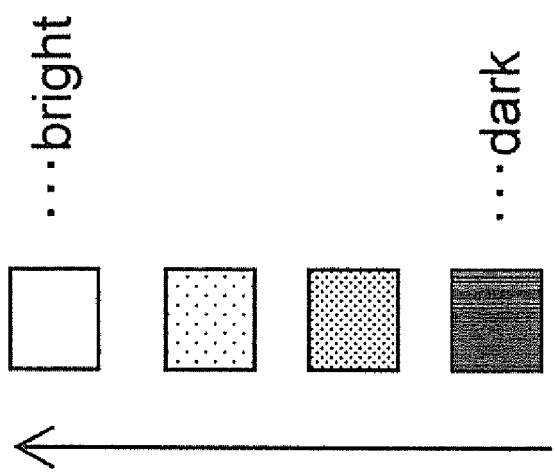
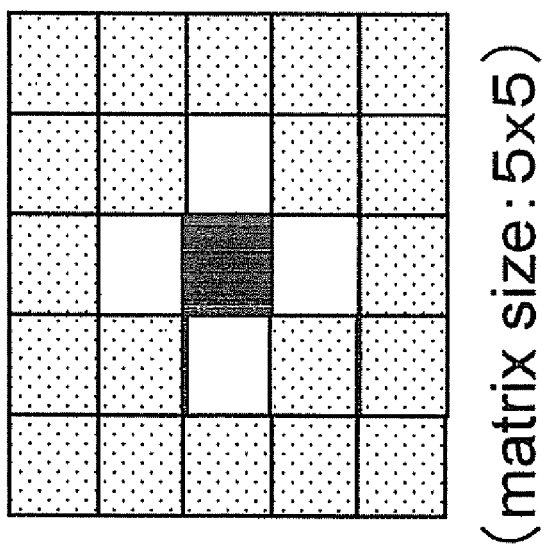
FIG. 10

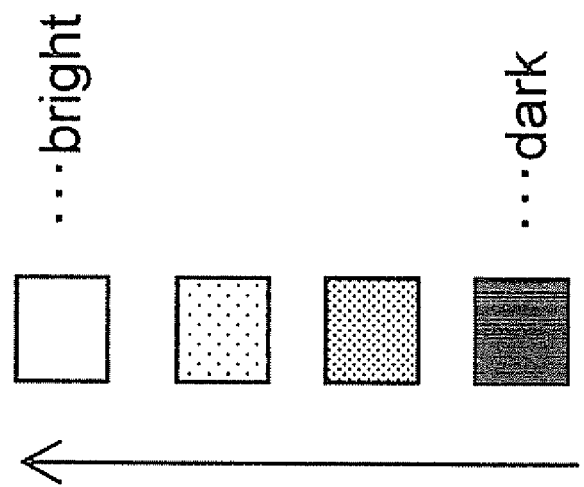
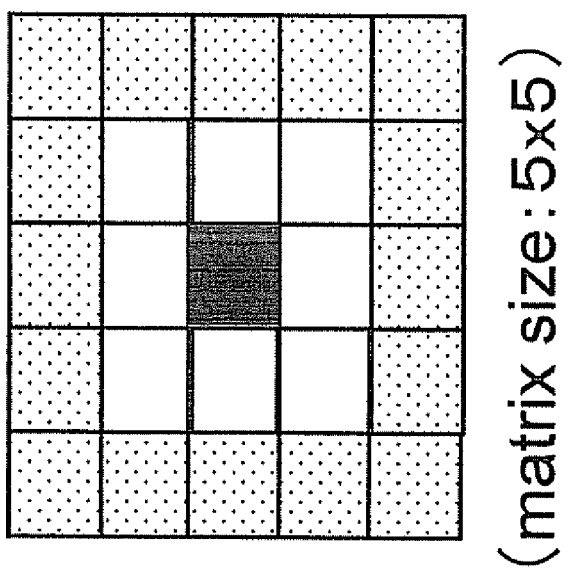
FIG. 11

| tap | T1 | T2 | T3 | T4 | T5 |
|---|---|---|---|---|---|
| factor | 1/16 | 1/8 | — | 1/8 | 1/16 |

FIG. 16

IMAGE PROCESSING APPARATUS

CROSS REFERENCE TO RELATED APPLICATION

This application is based upon and claims the benefit of priority from the prior Japanese Patent Application No. P2009-131562, filed on May 29, 2009, the entire contents of which are incorporated herein by reference.

FIELD OF THE INVENTION

The invention relates to an image processing apparatus, and particularly, to edge correction of an image by the same.

DESCRIPTION OF THE BACKGROUND

In an image processing apparatus used for a TV, an image monitor, a digital camera and the like, enhancement processing is performed independently on image data lying in the horizontal direction from a focus pixel and on image data lying in the vertical direction from the focus pixel, on the basis of a change in luminance and/or color of the image data. The enhancement processing is disclosed in Japanese Patent Application Publication No. 2006-304352.

When the enhancement processing is performed on image data lying in a diagonal direction, the enhancement processing has a problem that the image data ends up with a stepwise aliasing line. In a case of noise contamination in image data, a noise in a bright portion of the image data tends to be less unnoticeable whereas a noise in a dark portion tends to be noticeable even if the noises are of the same level. When noise reduction processing is uniformly applied to the whole screen image, there occurs a problem that it is difficult to reduce noises on both a bright portion and a dark portion simultaneously and effectively.

SUMMARY OF THE INVENTION

According to an aspect of the invention is provided an image processing apparatus, comprising a delay circuit unit to receive image signals directly or via line memories, the delay circuit unit having delay circuits arranged in an m×n matrix form (where m and n are integers not less than 3), a first filter processing circuit to receive image data signals lying in a horizontal direction of the delay circuit unit, and to generate a first filter processing signal by performing filter processing on the received image data lying in the horizontal direction, a second filter processing circuit to receive image data signals lying in a vertical direction of the delay circuit unit, and to generate a second filter processing signal by performing filter processing on the received image data lying in the vertical direction, a third filter processing circuit to receive image data signals lying in a down-right direction of the delay circuit unit, and to generate a third filter processing signal by performing filter processing on the received image data lying in the down-right direction, and a fourth filter processing circuit to receive image data signals lying in a down-left direction of the delay circuit unit, and to generate a fourth filter processing signal by performing filter processing on the received image data lying in the down-left direction.

According to another aspect of the invention is provided an image processing apparatus, comprising a delay circuit unit to receive image signals directly or via line memories, the delay circuit unit having delay circuits arranged in an m×n matrix form (where m and n are integers not less than 3), a first filter processing circuit to receive image data signals lying in a horizontal direction of the delay circuit unit, and to generate a first filter processing signal by performing filter processing on the received image data lying in the horizontal direction, a second filter processing circuit to receive image data signals lying in a vertical direction of the delay circuit unit, and to generate a second filter processing signal by performing filter processing on the received image data lying in the vertical direction, a third filter processing circuit to receive image data signals lying in a down-right direction of the delay circuit unit, and to generate a third filter processing signal by performing filter processing on the received image data lying in the down-right direction, a fourth filter processing circuit to receive image data signals lying in a down-left direction of the delay circuit unit, and to generate a fourth filter processing signal by performing filter processing on the received image data lying in the down-left direction, a first nonlinear processing circuit to receive a first image data signal, which is of image data on a focus pixel of the delay circuit unit, and to generate a first nonlinear processing signal, a second nonlinear processing circuit to receive the first image data signal and the second filter processing signal, and to generate a second nonlinear processing signal, a third nonlinear processing circuit to receive the first image data signal and the third filter processing signal, and to generate a third nonlinear processing signal, a fourth nonlinear processing circuit to receive the first image data signal and the fourth filter processing signal, and to generate a fourth nonlinear processing signal, and an adder to receive the first image data and the first to fourth nonlinear processing signals, and to perform addition of the first image data and the first to fourth nonlinear processing signals.

According to another aspect of the invention is provided an image processing apparatus, comprising a delay circuit unit to receive image signals directly or via line memories, the delay circuit unit having delay circuits arranged in an m×n matrix form (where m and n are integers not less than 3), a first filter processing circuit to receive image data signals lying in a horizontal direction of the delay circuit unit, and to generate a first filter processing signal by performing filter processing on the received image data lying in the horizontal direction, a second filter processing circuit to receive image data signals lying in a vertical direction of the delay circuit unit, and to generate a second filter processing signal by performing filter processing on the received image data lying in the vertical direction, a third filter processing circuit to receive image data signals lying in a down-right direction of the delay circuit unit, and to generate a third filter processing signal by performing filter processing on the received image data lying in the down-right direction, a fourth filter processing circuit to receive image data signals lying in a down-left direction of the delay circuit unit, and to generate a fourth filter processing signal by performing filter processing on the received image data lying in the down-left direction, a first adder to receive the first to fourth filter processing signals, and to generate an addition processing signal by performing addition of the filter-processed image data in the horizontal direction, the filter-processed image data in the vertical direction, the filter-processed image data in the down-right direction, and the filter-processed image data in the down-left direction, a nonlinear processing circuit to receive a first image data signal, which is image data on a focus pixel of the delay circuit unit, and the addition processing signal, and to generate a coring-processed nonlinear processing signal by generating a constant coring value which stays constant in an area where a luminance value of the first image data signal is not less than a first predetermined value and also generating a variable coring value which varies in another area where the luminance value of the first image data signal is not more than the first predetermined value, the variable coring value increasing as the luminance value of the first image data signal decreases so as to be larger than the constant coring value, and performing coring processing on the addition-processed image data with the generated coring value, and a second adder to receive the first image data signal and the nonlinear processing signal, and to generate an enhancement-processed image by performing addition of the image data on the focus pixel of the delay circuit unit and the coring-processed image data.

BRIEF DESCRIPTION OF THE DRAWINGS

FIG. 7 is a table showing an exemplary factor setting for the filter processing circuit according to the first embodiment of the invention.

FIG. 9 is a diagram showing an exemplary cutout image of 5×5 pixels before the enhancement processing according to the first embodiment of the invention.

FIG. 10 is a diagram showing an exemplary cutout image of 5×5 pixels after the enhancement processing in the horizontal and vertical directions according to the first embodiment of the invention.

FIG. 11 is a diagram showing an exemplary cutout image of 5×5 pixels after the enhancement processing in the horizontal, vertical, down-right, and down-left directions according to the first embodiment of the invention.

FIG. 16 is a table showing an exemplary factor setting for the filter processing circuit according to the second embodiment of the invention.

DETAILED DESCRIPTION OF THE INVENTION

In the following, the embodiments of the invention are described with reference to the drawings.

Figure 1:
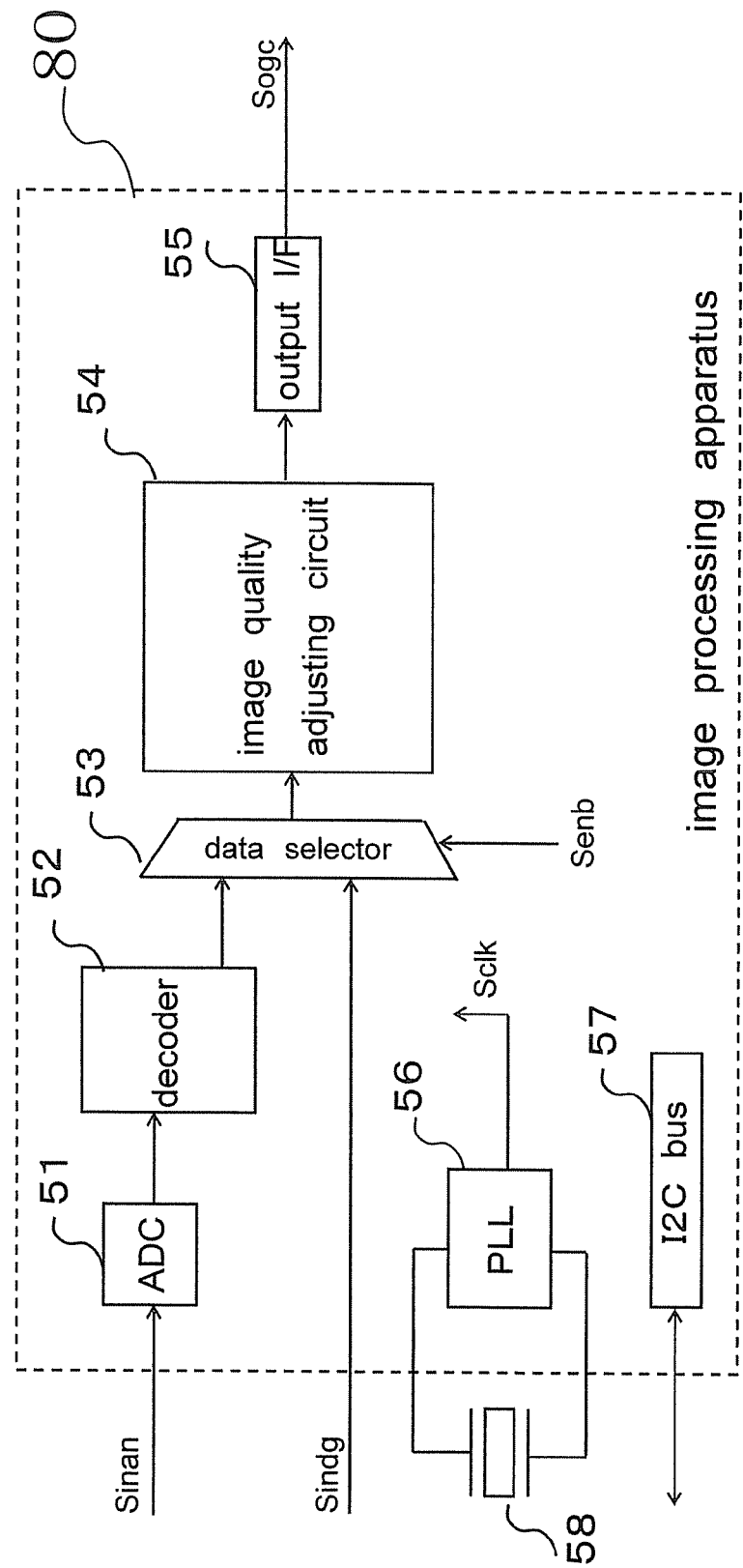
FIG. 1 is a block diagram showing a schematic configuration of an image processing apparatus according to a first embodiment of the invention.
Figure 2:
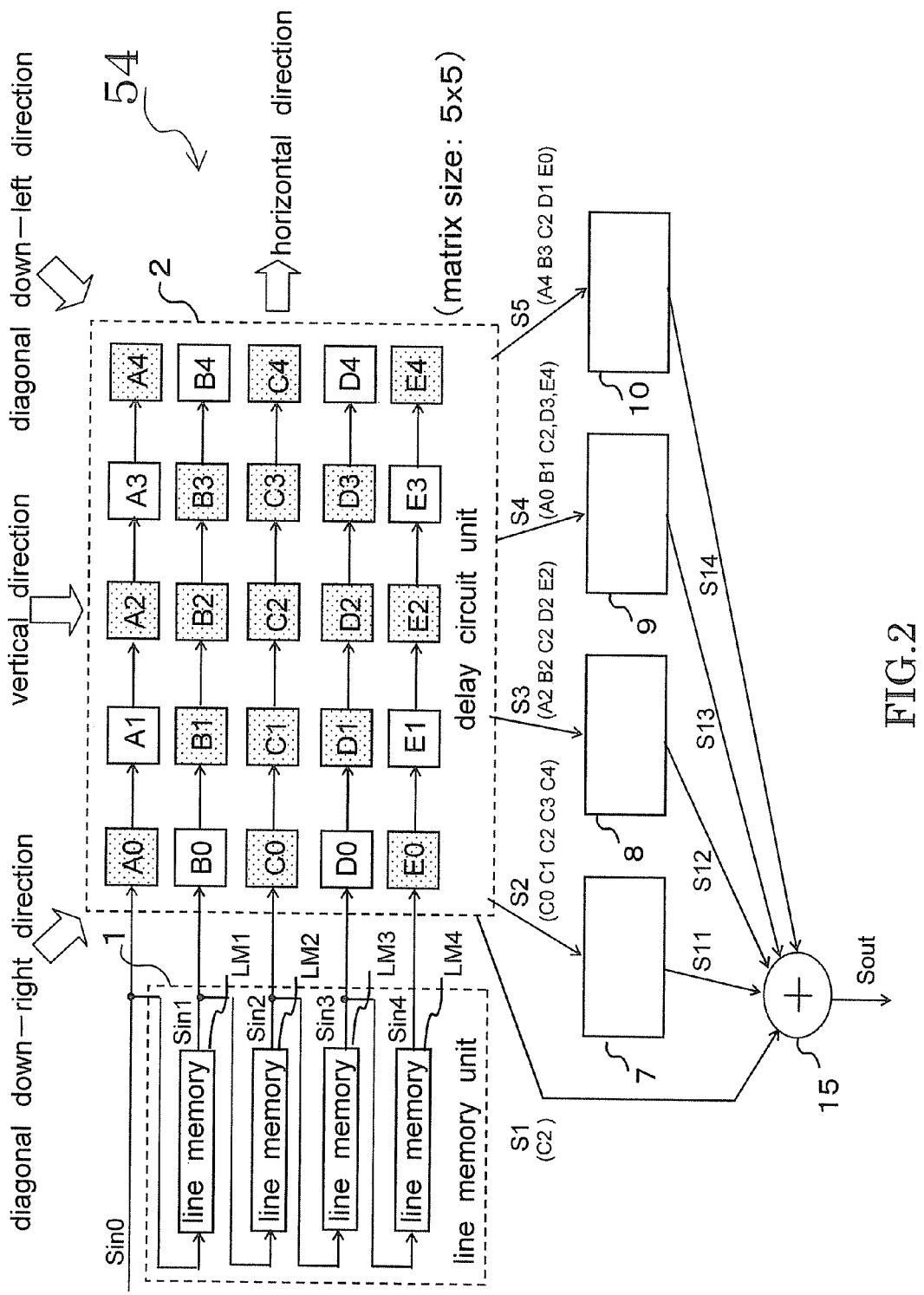
FIG. 2 is a block diagram showing a configuration of an image quality adjusting circuit according to the first embodiment of the invention.
Figure 3:
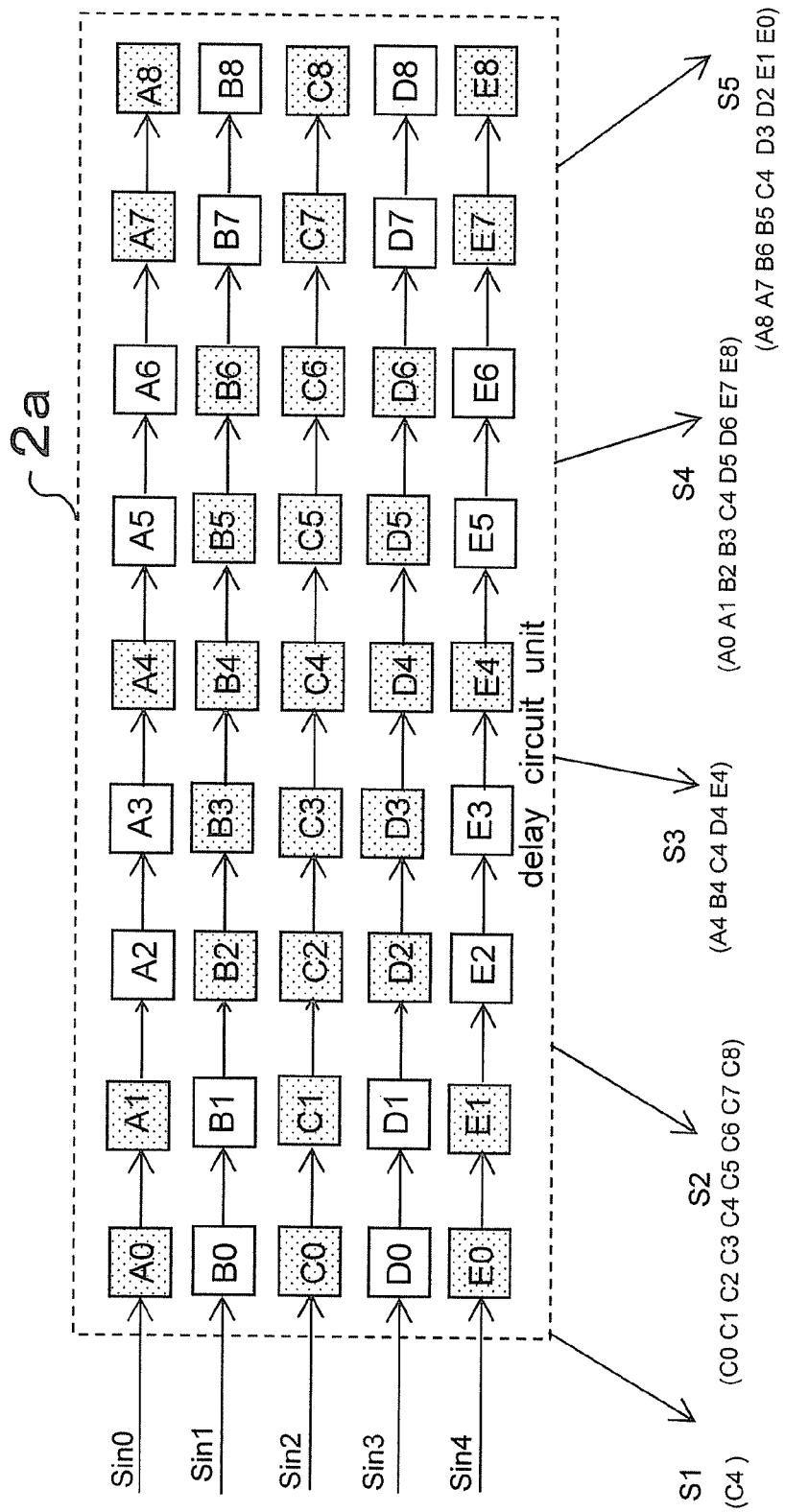
FIG. 3 is a block diagram of a delay circuit unit with a modified matrix according to the first embodiment of the invention.
Figure 4:
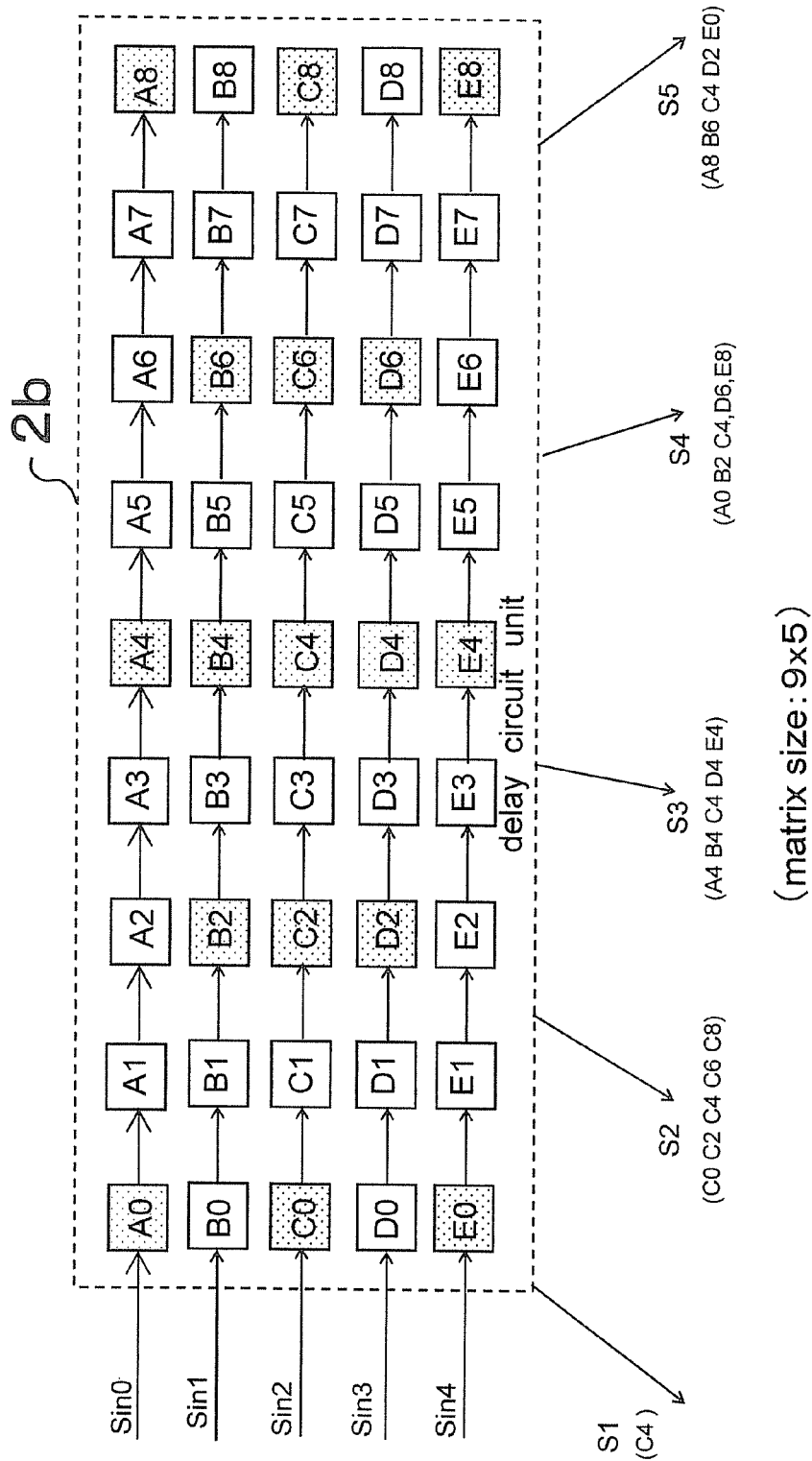
FIG. 4 is a block diagram of the delay circuit unit with another modified matrix according to the first embodiment of the invention.
Figure 5:
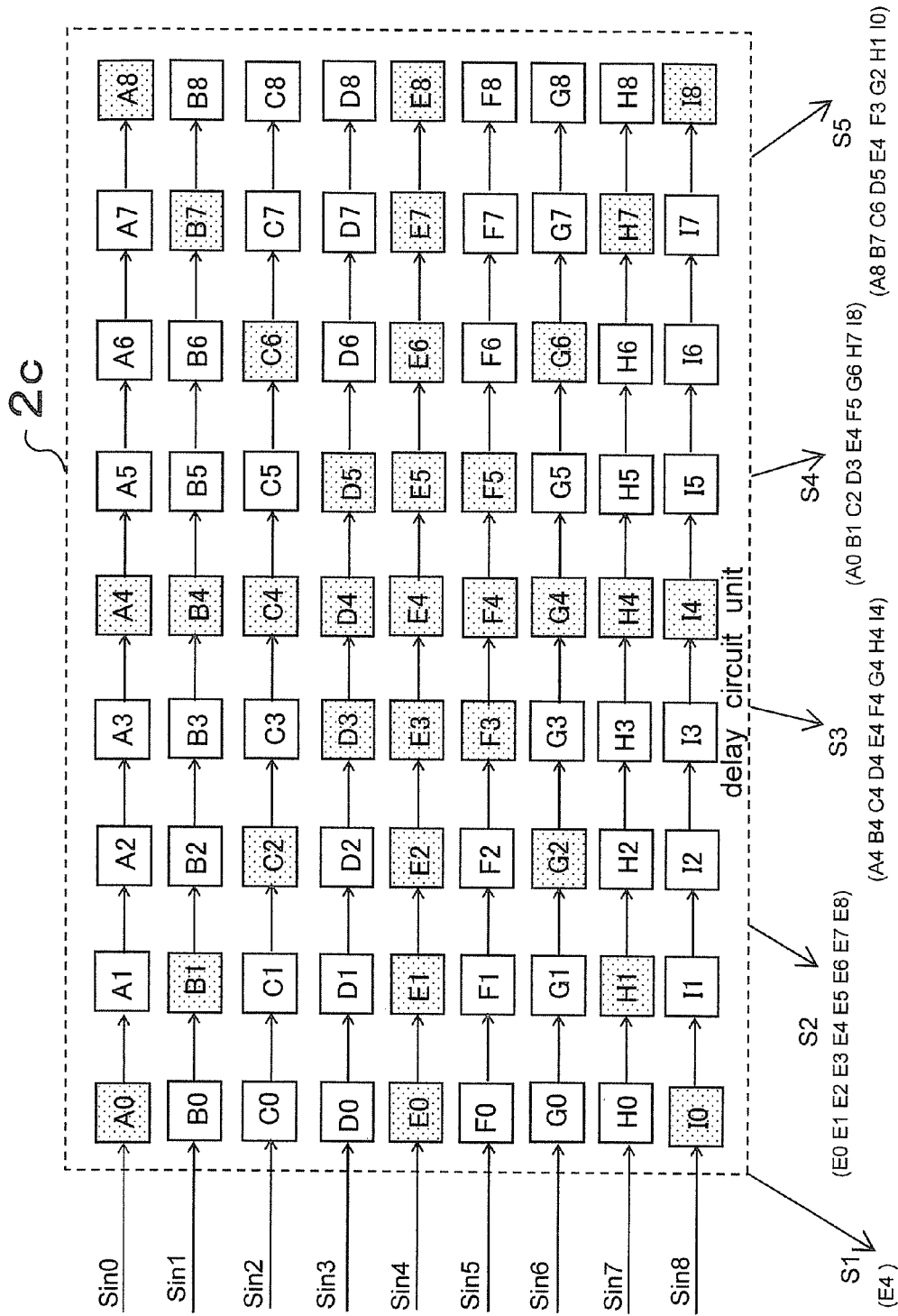
FIG. 5 is a block diagram of the delay circuit unit with still another modified matrix according to the first embodiment of the invention.
Figure 6:
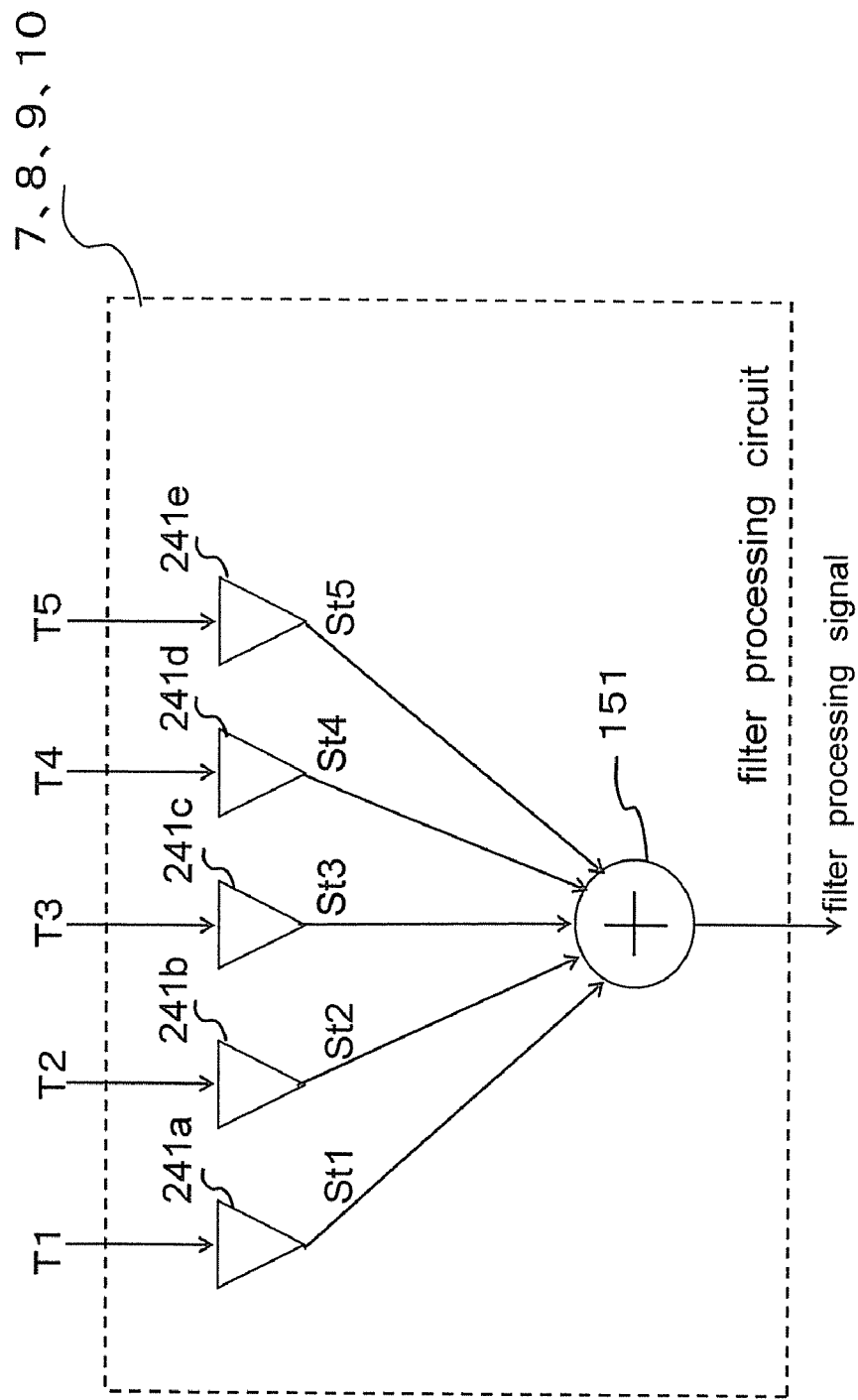
FIG. 6 is a block diagram showing a filter processing circuit according to the first embodiment of the invention.
Figure 7:
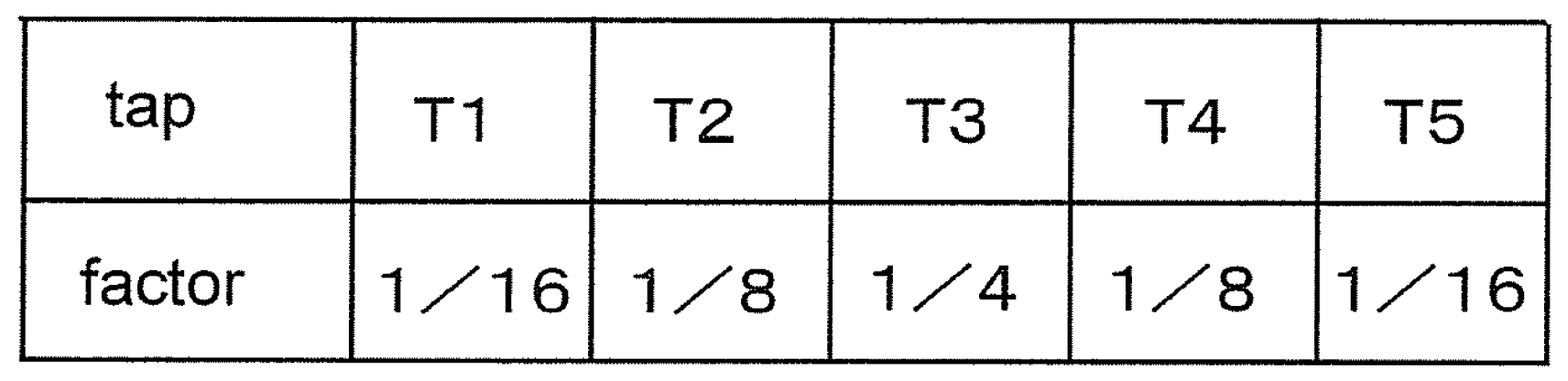

An image processing apparatus according to a first embodiment of the invention is described with reference to the drawings. FIG. 1 is a block diagram showing a schematic configuration of the image processing apparatus. FIG. 2 is a block diagram showing a configuration of an image quality adjusting circuit. FIGS. 3 to 5 are each a block diagram of a delay circuit unit with a modified matrix. FIG. 6 is a block diagram showing a filter processing circuit. FIG. 7 is a table showing an exemplary factor setting for the filter processing circuit. In the embodiments, edge correction processing is performed in the horizontal, vertical, down-right, and down-left directions.

As shown in FIG. 1, an image processing apparatus 80 is provided with an analog-to-digital converter (ADC) 51, a decoder 52, a data selector 53, an image quality adjusting circuit 54, an output I/F 55, a phase-locked loop (PLL) 56, and an I2C bus 57. The image processing apparatus 80 is used for a TV, an image monitor, and a digital camera and the like.

The PLL 56 receives an oscillation signal generated by an oscillator (e.g., a crystal oscillator) provided outside the image processing apparatus 80. The PLL 56 generates and supplies multiplied clock signals Sclk to various circuits provided inside the image processing apparatus 80. The I2C bus exchanges information and signals with the outside in compliance with I2C.

The ADC 51 receives input signals Sinan, which are analog video signals such as CVBS (NTSC/PAL). The ADC 51 performs analog-to-digital conversion on the analog input signals Sinan at a high speed. The analog-to-digital converted signals outputted from the ADC 51 are inputted to the decoder 52. The decoder 52 performs decoding processing on the analog-to-digital converted signals.

The data selector 53 receives the signals decoded by the decoder 52, and input signals Sindg, which are digital video signals such as D-RGB, D-YUV, for example. The data selector 53 selects and outputs either the decoded signals or the input signals Sindg, on the basis of an enable signal Senb. Specifically, the data selector 53 selects and outputs the decoded signals when the enable signal Senb is in an enabled state (e.g., high level), and the input signals Sindg when the enable signal Senb is in a disabled state (e.g., low level).

The image quality adjusting circuit 54 receives the signals selected and outputted by the data selector 53, and performs various kinds of image quality adjustment processing on the signals. For example, the image quality adjusting circuit 54 performs edge correction processing, tone adjustment processing, gamma correction processing, white adjustment processing, black adjustment processing and the like. The output I/F 55 receives the signals subjected to the image quality adjustments by the image quality adjusting circuit 54. The output I/F 55 outputs amplified output signals Sogc to the outside of the image processing apparatus 80. The output signals Sogc are signals complying with the digital formats, such as ITU-R BT.601 or ITU-R BT.656.

As shown in FIG. 2, the image quality adjusting circuit 54 is provided with a line memory unit 1, a delay circuit unit 2, filter processing circuits 7 to 10, and an adder 15. Edge correction processing is performed by the line memory unit 1, the delay circuit unit 2, the filter processing circuits 7 to 10, and the adder 15. Specifically, filter processing is performed on inputted image data as enhancement processing.

In general, image data pieces are inputted serially, and the serially-inputted image pixels form noteworthy pixels sequentially. In order to generate an m×n matrix centered on a focus pixel, a frame memory and a delay circuit unit are used and edge correction processing is performed on the focus pixel and the pixels around the focus pixel.

The line memory unit 1 is provided with line memories LM1 to LM4. The line memories LM1 to LM4 are each formed of an SRAM, for example. The line memories LM1 to LM4 each shift corresponding image data pixel by pixel in synchronization with an input signal or the clock signal Sclk inputted simultaneously with the input signal. Here, SRAMs are used for the line memories LM1 to LM4, but alternatively, shift registers using flip-flops may also be used to form the line memories LM1 to LM4.

In the delay circuit unit 2, delay circuits A0 to A4, B0 to B4, C0 to C4, D0 to D4, and E0 to E4 are arranged in a 5×5 matrix form. Here, flip-flops are used for the delay circuits A0 to A4, B0 to B4, C0 to C4, D0 to D4, and E0 to E4; however, logic gate circuits, in which a clock signal is inputted, may alternatively be used.

A digitally-processed image signal Sin0 is sequentially inputted to the delay circuits A0 to A4 arranged in the horizontal direction in the delay circuit unit 2. "Sequentially" in this context means that an image signal Sin0 is inputted to the delay circuit A0, then the image signal Sin0 is inputted to the delay circuit A1 via the delay circuit A0, then the image signal Sin0 is inputted to the delay circuit A2 via the delay circuits A0 and A1, then the image signal Sin0 is inputted to the delay circuit A3 via the delay circuits A0 to A2, and then the image signal Sin0 is inputted to the delay circuit A4 via delay the circuits A0 to A3.

The line memory LM1 receives the digitally-processed image signal Sin0. The line memory LM1 sequentially outputs an image signal Sin1, which is one line (1H) before, to the delay circuits B0 to B4 arranged in the horizontal direction in the delay circuit unit 2.

The Line memory LM2 receives the image signal Sin1. The line memory LM2 sequentially outputs an image signal Sin2, which is two lines (2H) before, to the delay circuits C0 to C4 arranged in the horizontal direction in the delay circuit unit 2.

The line memory LM3 receives the image signal Sin2. The line memory LM3 sequentially outputs an image signal Sin3, which is three lines (3H) before, to the delay circuits D0 to D4 arranged in the horizontal direction in the delay circuit unit 2.

The line memory LM4 receives the image signal Sin3. The line memory LM4 sequentially outputs an image signal Sin4, which are four lines (4H) before, to the delay circuits E0 to E4 arranged in the horizontal direction in the delay circuit unit 2.

Here, the delay circuit unit 2 has a 5×5 matrix arrangement. However, as shown in FIG. 3, it is possible to employ a delay circuit unit 2a having a 9×5 matrix arrangement obtained by additionally inserting delay circuits in the horizontal direction. In this case, image data signals S3 lying in the vertical direction are equivalent to five taps. Image data signals S2 lying in the horizontal direction, image data signals S4 lying in the down-right direction, and image data signals S5 lying in the down-left direction are each equivalent to 9 taps. Note that a tap means the output of a delay circuit.

FIG. 4 shows a case where the computing amount is reduced in a delay circuit unit having the 9×5 matrix arrangement. In this case, there are 5 taps in each of the horizontal, vertical, down-right, and down-left directions, and the low frequency component in the horizontal direction can be highly effected without increasing the computing amount. As shown in FIG. 5, the delay circuits may be arranged in a 9×9 matrix form, for example, and the number of taps to be monitored in the horizontal, vertical, down-right, and down-left directions may be increased.

The filter processing circuit 7 (a first filter processing circuit) is provided between the delay circuit unit 2 and the adder 15. The filter processing circuit 7 receives the image data signals S2 lying in the horizontal direction. The filter processing circuit 7 performs filter processing on the image data lying in the horizontal direction, and outputs a filter processing signal S11 (a first filter processing signal) to the adder 15.

Here, the image data signals S2 lying in the horizontal direction correspond to the image data signals outputted from the delay circuits C0, C1, C2, C3, and C4, respectively.

The filter processing circuit 8 (a second filter processing circuit) is provided between the delay circuit unit 2 and the adder 15. The filter processing circuit 8 receives the image data signals S3 lying in the vertical direction. The filter processing circuit 8 performs filter processing on the image data lying in the vertical direction, and outputs a filter processing signal S12 (a second filter processing signal) to the adder 15. Here, the image data signals S3 lying in the vertical direction correspond to the image data signals outputted from the delay circuits A2, B2, C2, D2, and E2, respectively.

The filter processing circuit 9 (a third filter processing circuit) is provided between the delay circuit unit 2 and the adder 15. The filter processing circuit 9 receives the image data signals S4 lying in the down-right direction. The filter processing circuit 9 performs filter processing of the image data lying in the down-right direction, and outputs a filter processing signal S13 (a third filter processing signal) to the adder 15. Here, the image data signals S4 lying in the down-right direction correspond to the image data signals outputted from the delay circuits A0, B1, C2, D3, and E4, respectively.

The filter processing circuit 10 (a fourth filter processing circuit) is provided between the delay circuit unit 2 and the adder 15. The filter processing circuit 10 receives the image data signals S5 lying in the down-left direction. The filter processing circuit 10 performs filter processing of the image data lying in the down-left direction, and outputs a filter processing signal S14 (a fourth filter processing signal) to the adder 15. Here, the image data signals S5 lying in the down-left direction correspond to the image data signals outputted from the delay circuits A4, B3, C2, D1, and E0, respectively.

The adder 15 receives an image data signal S1 of a focus pixel (the pixel of the delay circuit C2), and the filter processing signals S11 to 14 subjected to the enhancement processing. The adder 15 performs addition of the image data on the focus pixel and the filter-processed image data. Consequently, edge-corrected image data obtained by the enhancement processing is outputted from the adder 15.

As shown in FIG. 6, the filter processing circuits 7 to 10 are each provided with filter factor processing circuits 241a to 241e and an adder 151. Each of the filter factor processing circuits 241a to 241e has a filter factor which is any value selected from 1, 1 to 0, 0 to −1, and the like. Here, a filter factor is used, but alternatively, a filter coefficient may also be used.

The filter factor processing circuit 241a receives the image data signal of a tap T1. The filter factor processing circuit 241a performs filter processing (enhancement processing) on the image data, and outputs a tap processing signal St1 to the adder 151.

The filter factor processing circuit 241b receives the image data signal of a tap T2. The filter factor processing circuit 241b performs filter processing (enhancement processing) on the image data, and outputs a tap processing signal St2 to the adder 151.

The filter factor processing circuit 241c receives the image data signal of a tap T3. The filter factor processing circuit 241c performs filter processing (enhancement processing) on the image data, and outputs a tap processing signal St3 to the adder 151.

The filter factor processing circuit 241d receives the image data signal of a tap T4. The filter factor processing circuit 241d performs filter processing (enhancement processing) on the image data, and outputs a tap processing signal St4 to the adder 151.

The filter factor processing circuit 241e receives the image data signal of a tap T5. The filter factor processing circuit 241e performs filter processing (enhancement processing) on the image data, and outputs a tap processing signal St5 to the adder 151.

The adder 151 receives the tap processing signals St1 to St5. The adder 151 performs addition of the received signals and outputs a filter processing signal.

In the case of the horizontal image data signals S2, for example, the taps T1, T2, T3, T4, and T5 correspond to the outputs of the delay circuits C0, C1, C2, C3, and C4, respectively. As shown in FIG. 7, the taps T1, T2, T3, T4, and T5 are weighted by factors of $1/16$, $1/8$, $1/4$, $1/8$, and $1/16$, respectively, for example. Though the taps are weighted by the factors shown in FIG. 7, these factors can be changed to any factors for the respective filter processing circuits 7 to 10.

Figure 8:
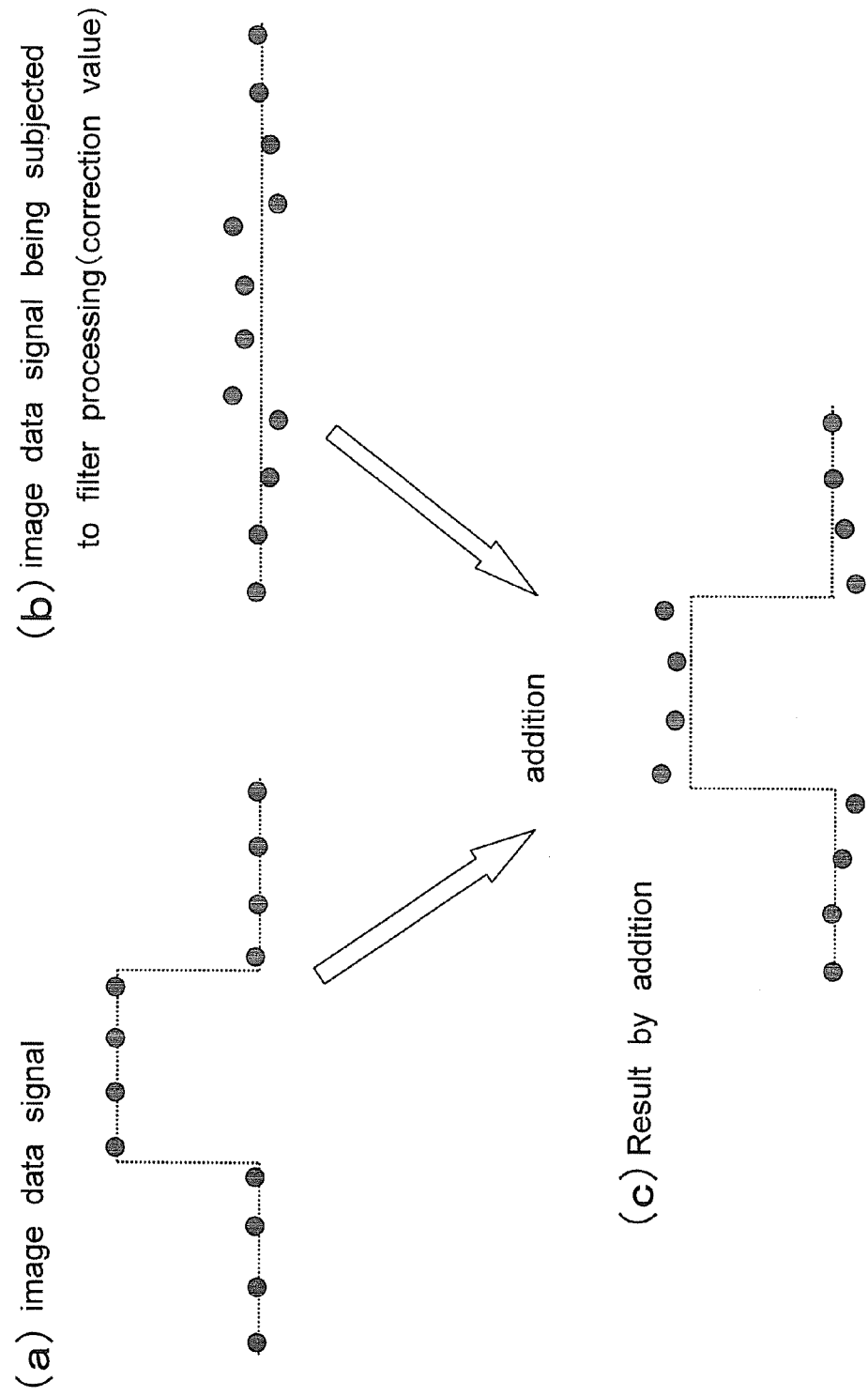
FIGS. 8A to 8C are diagrams each illustrating enhancement processing of the image quality adjusting circuit according to the first embodiment of the invention.
Figure 12:
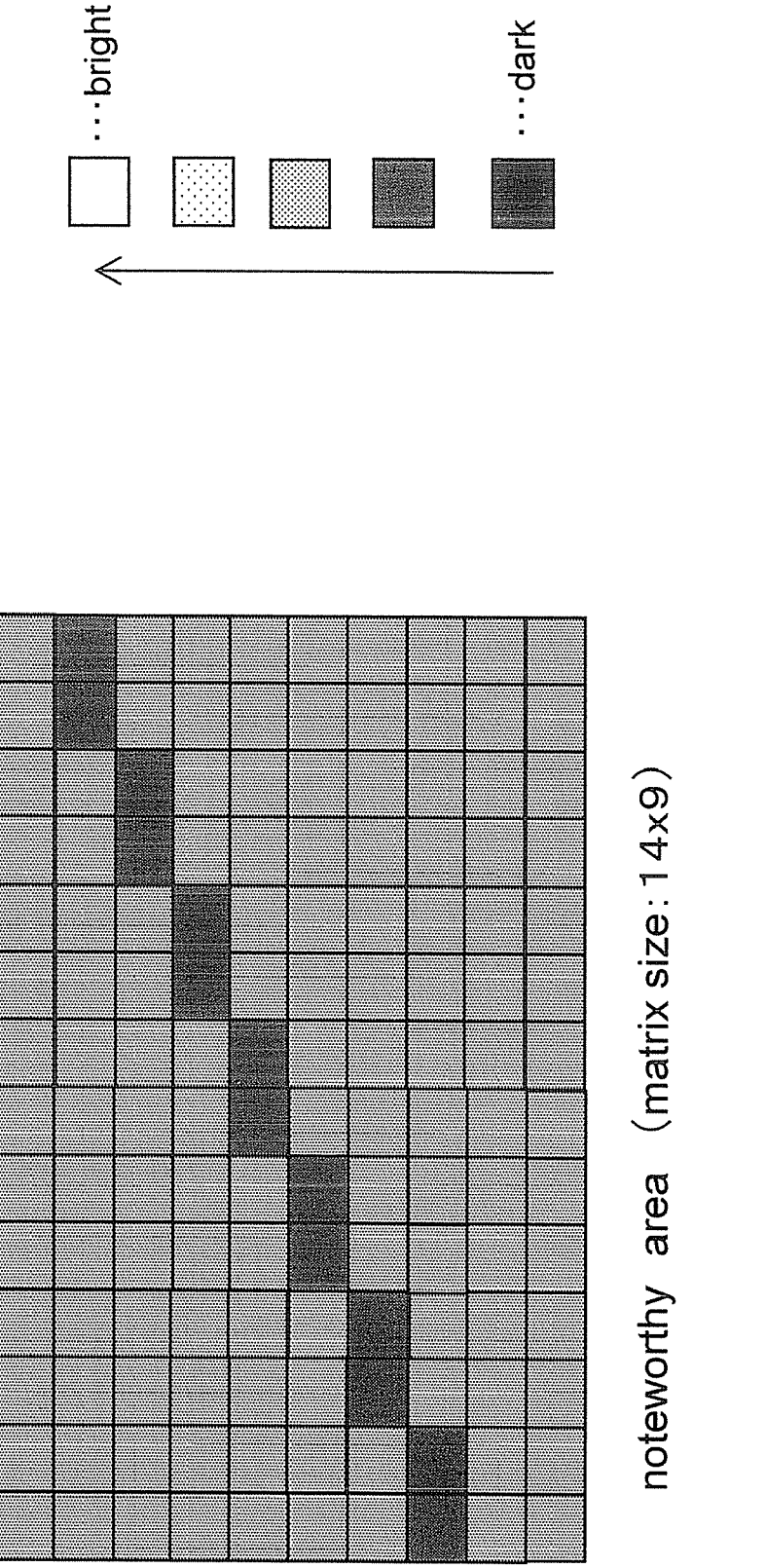
FIG. 12 is a diagram showing an exemplary cutout image of a noteworthy area (14×9) before the enhancement processing according to the first embodiment of the invention.
Figure 13:
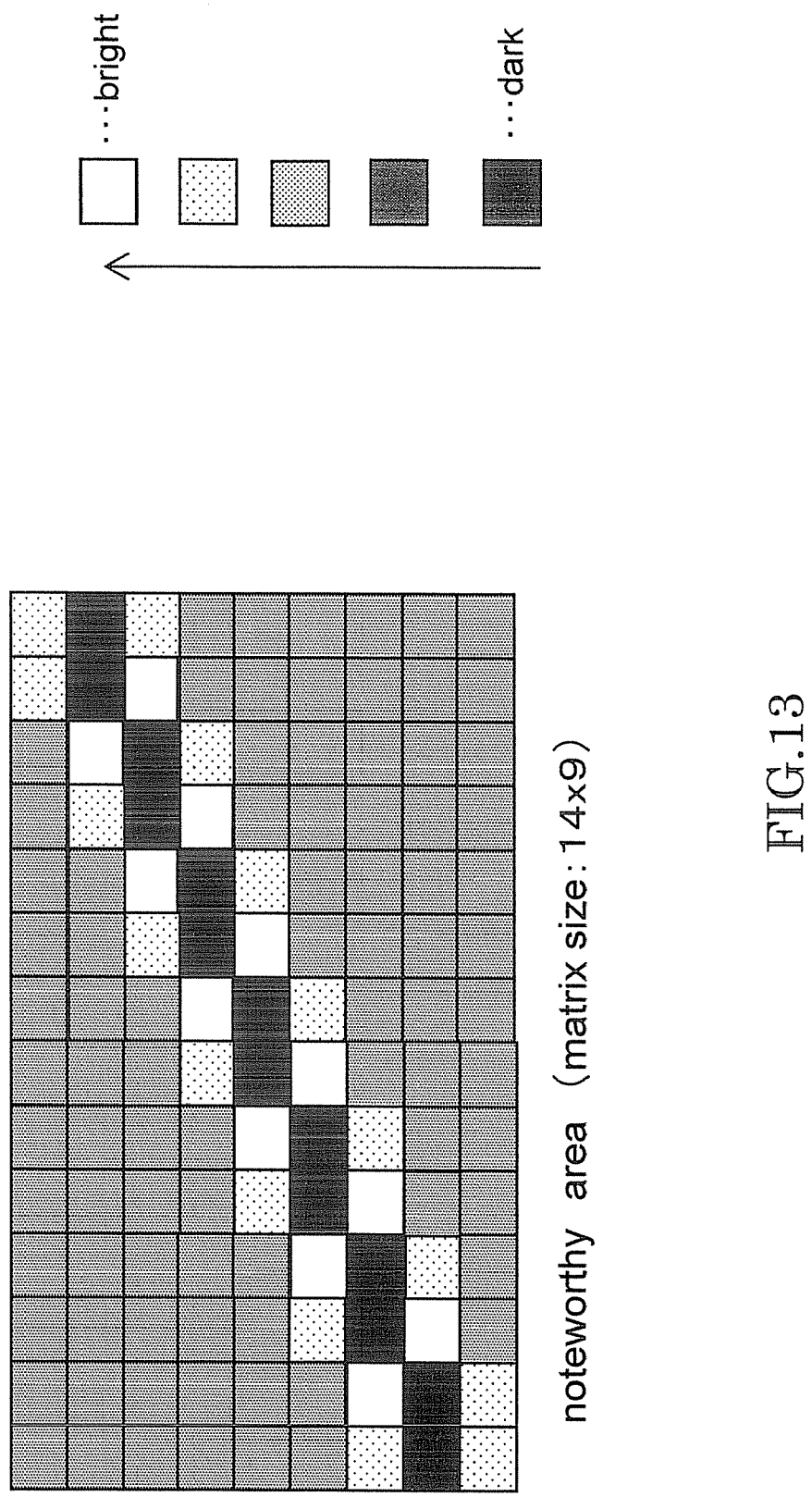
FIG. 13 is a diagram showing an exemplary cutout image of the noteworthy area (14×9) after the enhancement processing in the horizontal and vertical directions according to the first embodiment of the invention.
Figure 14:
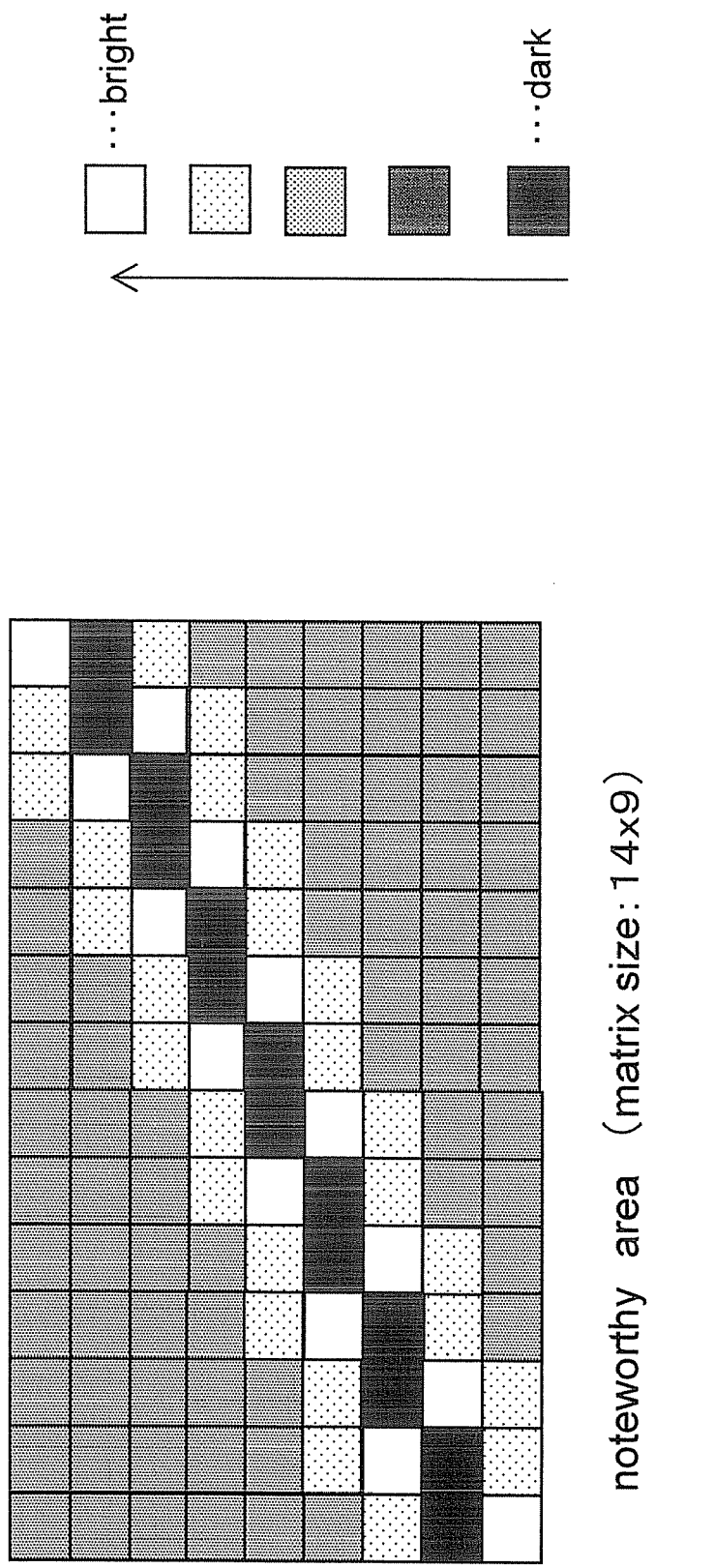
FIG. 14 is a diagram showing an exemplary cutout image of the noteworthy area (14×9) after the enhancement processing in the horizontal, vertical, down-right, and down-left directions according to the first embodiment of the invention.

Next, the image quality adjusting circuit is described with reference to FIGS. 8A to 14. FIGS. 8A to 8C are diagrams each illustrating enhancement processing of the image quality adjusting circuit. FIG. 9 is an exemplary image of 5×5 pixels centered on 1 pixel of a gray dot and cut out from a larger screen image before the enhancement processing. FIG. 10 is an exemplary image of the 5×5 pixels centered on the 1 pixel of the gray dot and cut out from the larger screen image after the enhancement processing in the horizontal and vertical directions. FIG. 11 is an exemplary image of the 5×5 pixels centered on the 1 pixel of the gray dot and cut out from the larger screen image after the enhancement processing in the horizontal, vertical, down-right, and down-left directions. FIG. 12 is an exemplary image of 14×9 noteworthy pixels including an oblique line and being cut out from a larger screen image before the enhancement processing. FIG. 13 is an exemplary image of the 14×9 noteworthy pixels including the oblique line and being cut out from the larger screen image after the enhancement processing in the horizontal and vertical directions. FIG. 14 is an exemplary image of the 14×9 noteworthy pixels including the oblique line and cut out from the larger screen image after the enhancement processing in the horizontal, vertical, down-right, and down-left directions.

It is assumed in FIGS. 10 and 11 that the enhancement processing exerts an effect only on a focus pixel and the adjacent pixels of the focus pixel. In each FIGS. 13 and 14, an output example of the enhancement processing performed with a 3×3 delay circuits is shown for easy understanding.

As shown in FIG. 8, the adder 15 performs, individually, addition of the inputted image data signals (FIG. 8A) and the respective image data signals subjected to the filter processing by the filter processing circuit (correction values in FIG. 8(b)). As a result, there are formed signals of edge-enhanced image data (FIG. 8(c)) obtained by the enhancement processing. The enhancement processing is performed in the horizontal, vertical, down-right, and down-left directions, respectively.

Specifically, in contrast to an exemplary image of 5×5 pixels centered on 1 pixel of a gray dot and cut out from a larger screen image before the enhancement processing (FIG. 9), there is described an exemplary cutout image of the 5×5 pixels after the enhancement processing in the horizontal and vertical directions (FIG. 10). In the exemplary image (FIG. 10), the enhancement processing has been performed on the focus pixel and the pixels horizontally and vertically adjacent to the focus pixels, whereby the center pixel becomes darker and the pixels horizontally and vertically adjacent to the center pixel become brighter. There are, however, relatively small luminance differences between the focus pixel and the pixels adjacent to the focus pixel in the down-left direction and in the down-right direction. Thus, the image is not clear and the edge is not clear. As a result, oblique aliasings of the image become noticeable.

On the other hand, in the exemplary cutout image of the 5×5 pixels (FIG. 11) after the enhancement processing in the horizontally, vertically, down-right, and down-left directions, the enhancement processing has been performed on the focus pixel and the pixels adjacent to the focus pixel in the horizontal, vertical, down-right, and down-left directions, whereby the center pixel becomes darker and the pixels horizontally, vertically, and diagonally adjacent to the center pixel become brighter. As a result, the image becomes clearer and the edge becomes clearer, and thus oblique aliasings of the image are considerably reduced.

In contrast to an exemplary image of 14×9 noteworthy pixels including an oblique line and being cut out from a larger screen image before the enhancement processing (FIG. 12), there is described an exemplary cutout image of the 14×9 noteworthy pixels after the enhancement processing in the horizontal and vertical directions (FIG. 13). In the exemplary image (FIG. 13), the enhancement processing is performed on each focus pixel and the pixels adjacent to the focus pixel in the horizontal and vertical directions. Accordingly, in the exemplary image (FIG. 13), the pixels on the oblique line become darker, and the pixels adjacent to the oblique line in the vertical and horizontal directions become brighter. There are, however, relatively small luminance differences in some areas between the focus pixel and the pixels adjacent to the focus pixel in the down-right and down-left directions. Thus, the image is not clear and the edge is not clear. As a result, there appear areas where the pixels on the oblique line differ in luminance from some pixels around the pixels of the oblique line by small margins. This leads to insufficient contrast enhancement of the oblique line.

On the other hand, in an exemplary cutout image after the enhancement processing in the horizontal, vertical, down-right, and down-left directions (FIG. 14), the luminance differences between the focus pixel and all the pixels adjacent to the focus pixel in the down-right and down-left directions become large as well. Thus, in the exemplary image (FIG. 14), the oblique line becomes clearer and the edge becomes clearer. Consequently, sufficient contrast enhancement can be made on the oblique line.

As described above, the image processing apparatus of the first embodiment is provided with the ADC 51, the decoder 52, the data selector 53, the image quality adjusting circuit 54, the output I/F 55, the PLL 56, and the I2C bus 57. The image quality adjusting circuit 54 is provided with the line memory unit 1, the delay circuit unit 2, the filter processing circuits 7 to 10, and the adder 15. The delay circuit unit 2 is provided with the delay circuits in a 5×5 matrix form. Each of the delay circuits lying in the horizontal direction receives an image data signal directly or via a line memory. The image quality adjusting circuit 54 performs the filter processing on the image data signals S2, S3, S4, and S5 which are outputted from the delay circuit unit 2 and which lie in the horizontal, vertical, down-right, and down-left directions, respectively. The enhancement processing is performed by adding the resultant correction value for the enhancement processing to the image data on the focus pixel (the pixel of the delay circuit C2), whereby edge correction is achieved.

Thus, oblique aliasings of the image are considerably reduced and contrast enhancement of the oblique line is achieved. This makes it possible to provide a clear image with enhanced edge.

Though the delay circuit unit 2 has a 5×5 matrix configuration, the configuration may be changed to an m×n (where m and n are integers not less than 3) matrix form as appropriate. For this reason, the angle of the image data signals S4 lying in the down-right direction and the angle of the image data signals S5 lying in the down-left direction are not necessarily limited to 45 degrees.

Figure 15:
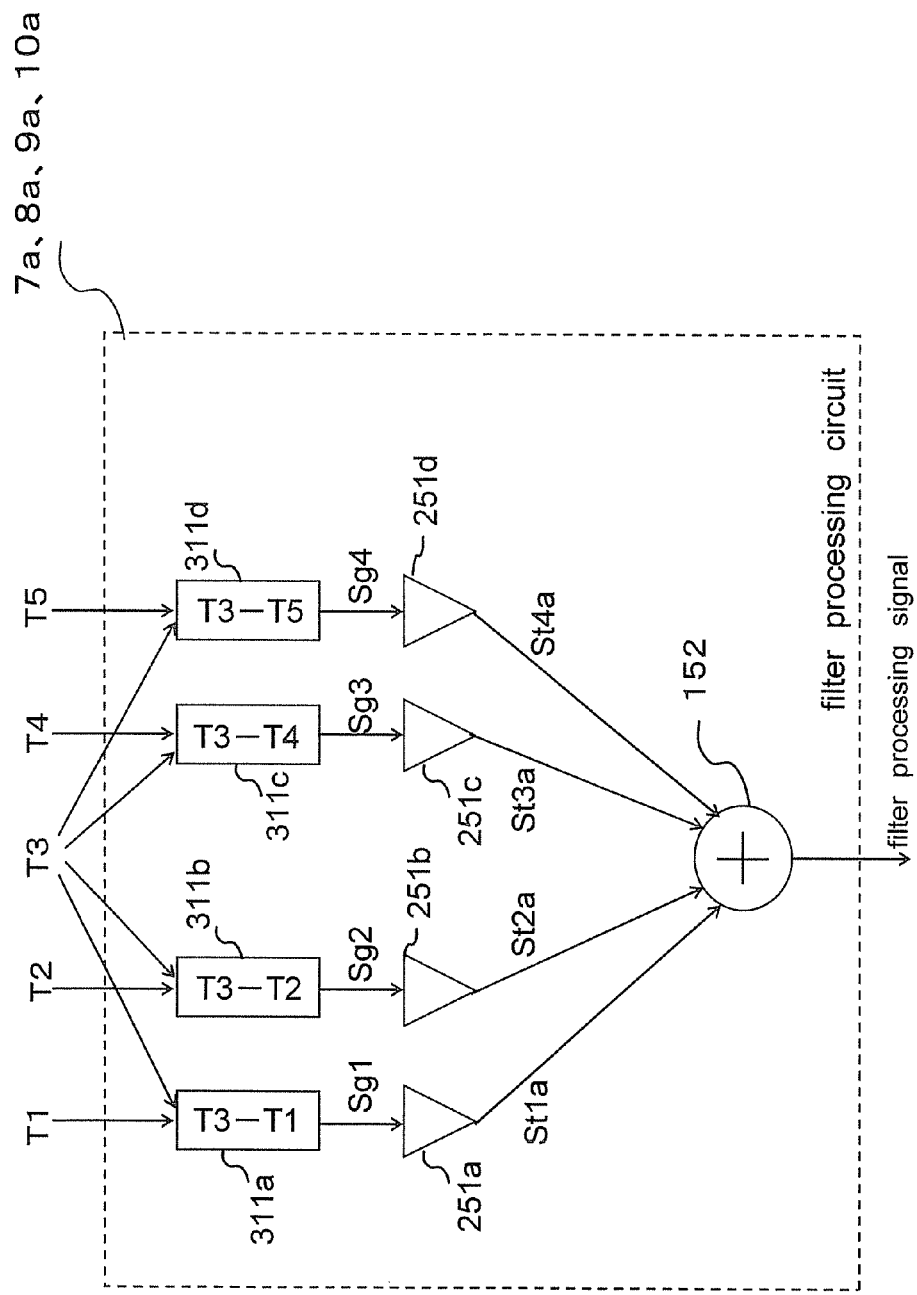
FIG. 15 is a block diagram showing a filter processing circuit according to a second embodiment of the invention.
Figure 16:
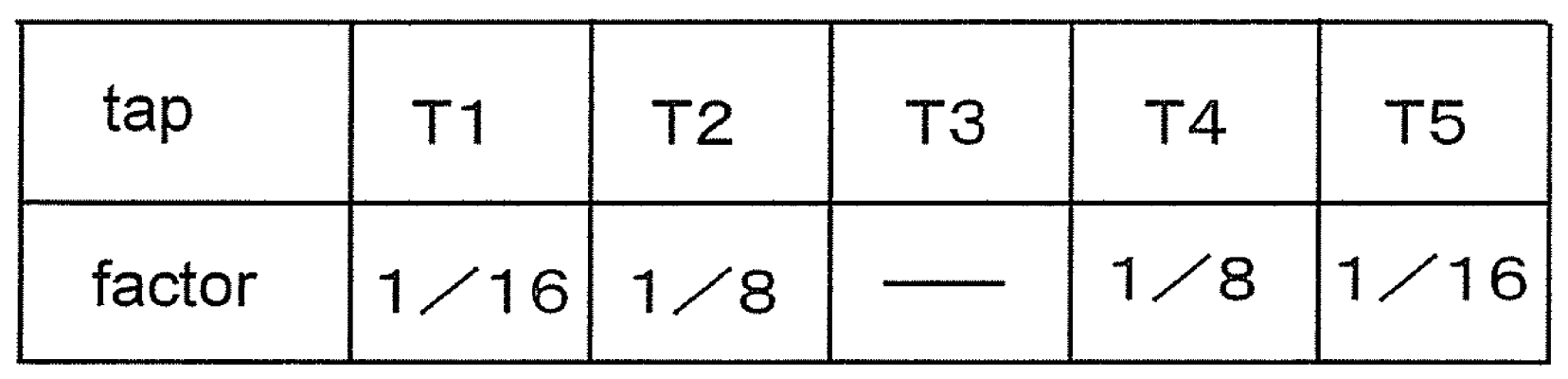

An image processing apparatus according to a second embodiment of the invention is described with reference to the drawings. FIG. 15 is a block diagram showing a filter processing circuit. FIG. 16 is a block diagram showing an exemplary factor setting for the filter processing circuit. In the second embodiment, the configuration of the filter processing circuit has been changed.

As shown in FIG. 15, filter processing circuits 7a to 10a of the image quality adjusting circuit are each provided with subtracters 311a to 311d, filter factor processing circuits 251a to 251d, and an adder 152 (addition processing circuit). The image quality adjusting circuit of the second embodiment has the same configuration as that of the first embodiment except for the filter processing circuits 7a to 10a.

The subtracter 311a receives taps T1 and T3. The subtracter 311a performs subtraction of the image data on the tap T1 from the image data on the tap T3, and outputs a subtraction processing signal Sg1 to the filter factor processing circuit 251a.

The subtracter 311b receives taps T2 and T3. The subtracter 311b performs subtraction of the image data on the tap T2 from the image data on the tap T3, and outputs a subtraction processing signal Sg2 to the filter factor processing circuit 251b.

The subtracter 311c receives taps T3 and T4. The subtracter 311c performs subtraction of the image data on the tap T4 from the image data on the tap T3, and outputs a subtraction processing signal Sg3 to the filter factor processing circuit 251c.

The subtracter 311d receives taps T3 and T5. The subtracter 311d performs subtraction of the image data on the tap T5 from the image data on the tap T3, and outputs a subtraction processing signal Sg4 to the filter factor processing circuit 251d.

Each of the filter factor processing circuits 251a to 251d has a filter factor which is any value selected from 1, 1 to 0, 0 to −1, and the like.

The filter factor processing circuit 251a is provided between the subtracter 311a and the adder 152. The filter factor processing circuit 251a receives the subtraction processing signal Sg1. The filter factor processing circuit 251a performs filter processing on the subtraction-processed image data, and outputs a tap processing signal St1a to the adder 152.

The filter factor processing circuit 251b is provided between the subtracter 311b and the adder 152. The filter factor processing circuit 251b receives the subtraction processing signal Sg2. The filter factor processing circuit 251b performs filter processing on the subtraction-processed image data, and outputs a tap processing signal St2a to the adder 152.

The filter factor processing circuit 251c is provided between the subtracter 311c and the adder 152. The filter factor processing circuit 251c receives the subtraction processing signal Sg3. The filter factor processing circuit 251c performs filter processing on the subtraction-processed image data, and outputs a tap processing signal St3a to the adder 152.

The filter factor processing circuit 251d is provided between the subtracter 311d and the adder 152. The filter factor processing circuit 251d receives the subtraction processing signal Sg4. The filter factor processing circuit 251d performs filter processing on the subtraction-processed image data, and outputs a tap processing signal St4a to the adder 152.

The adder 152 receives the tap processing signals St1a to St4a. The adder 152 performs addition of the received signals and outputs a filter processing signal.

As shown in FIG. 16, the taps T1, T2, T4, and T5 are weighted by factors of 1/16, 1/8, 1/8, and 1/16, respectively, for example. Though the taps are weighted by respective factors shown in FIG. 16, these factors can be changed to any factors for the respective filter processing circuits 7a to 10a.

As described above, in the image processing apparatus of the second embodiment, the filter processing circuits 7a to 10a of the image quality adjusting circuit are each provided with the subtracters 311a to 311d, the filter factor processing circuits 251a to 251d, and the adder 152, and performs the enhancement processing in the horizontal, vertical, down-right, and down-left directions by using them. Therefore, the image processing apparatus of the second embodiment achieves similar effects to those of the first embodiment.

Figure 17:
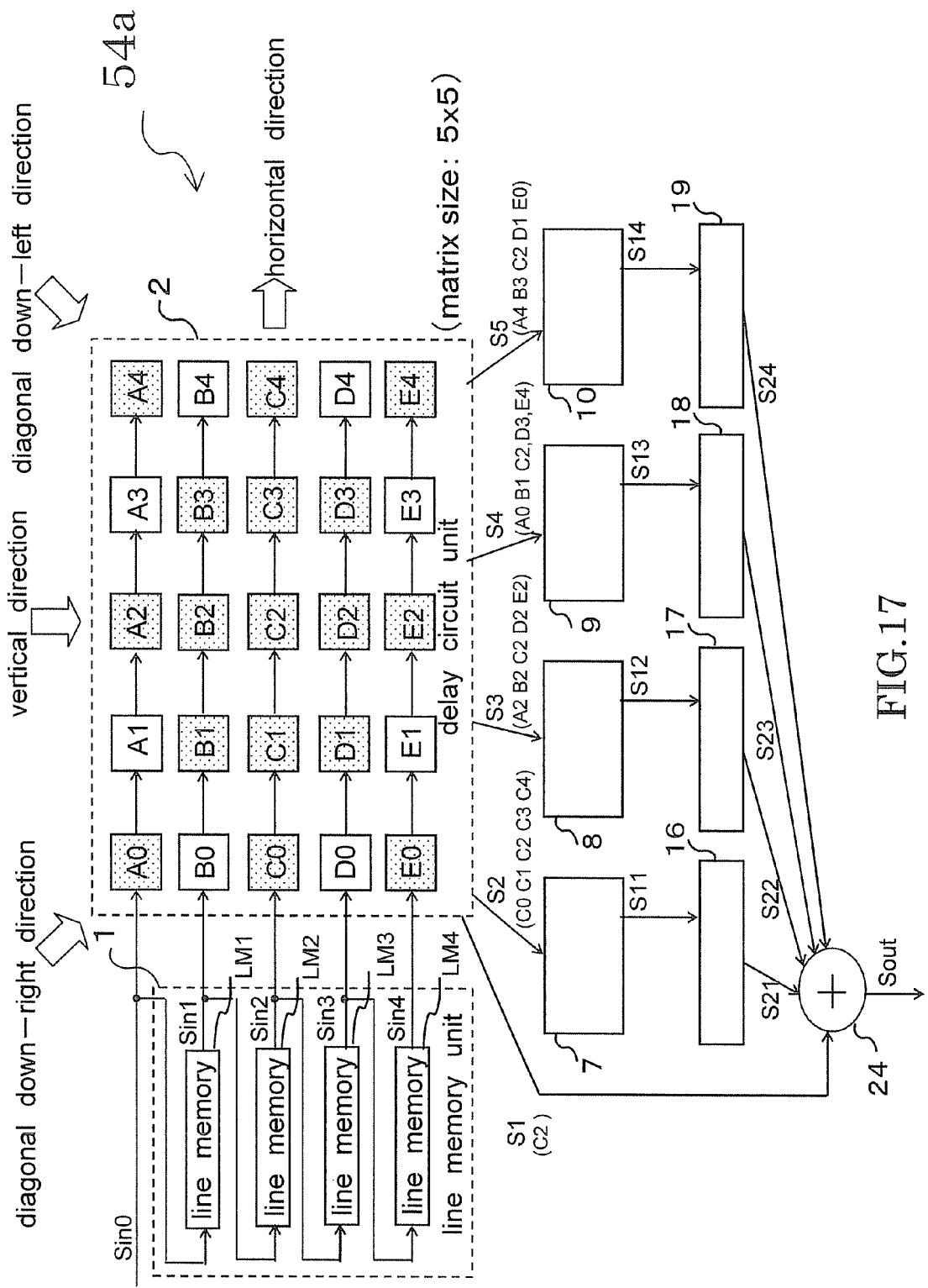
FIG. 17 is a block diagram showing a configuration of an image quality adjusting circuit according to a third embodiment of the invention.
Figure 18:
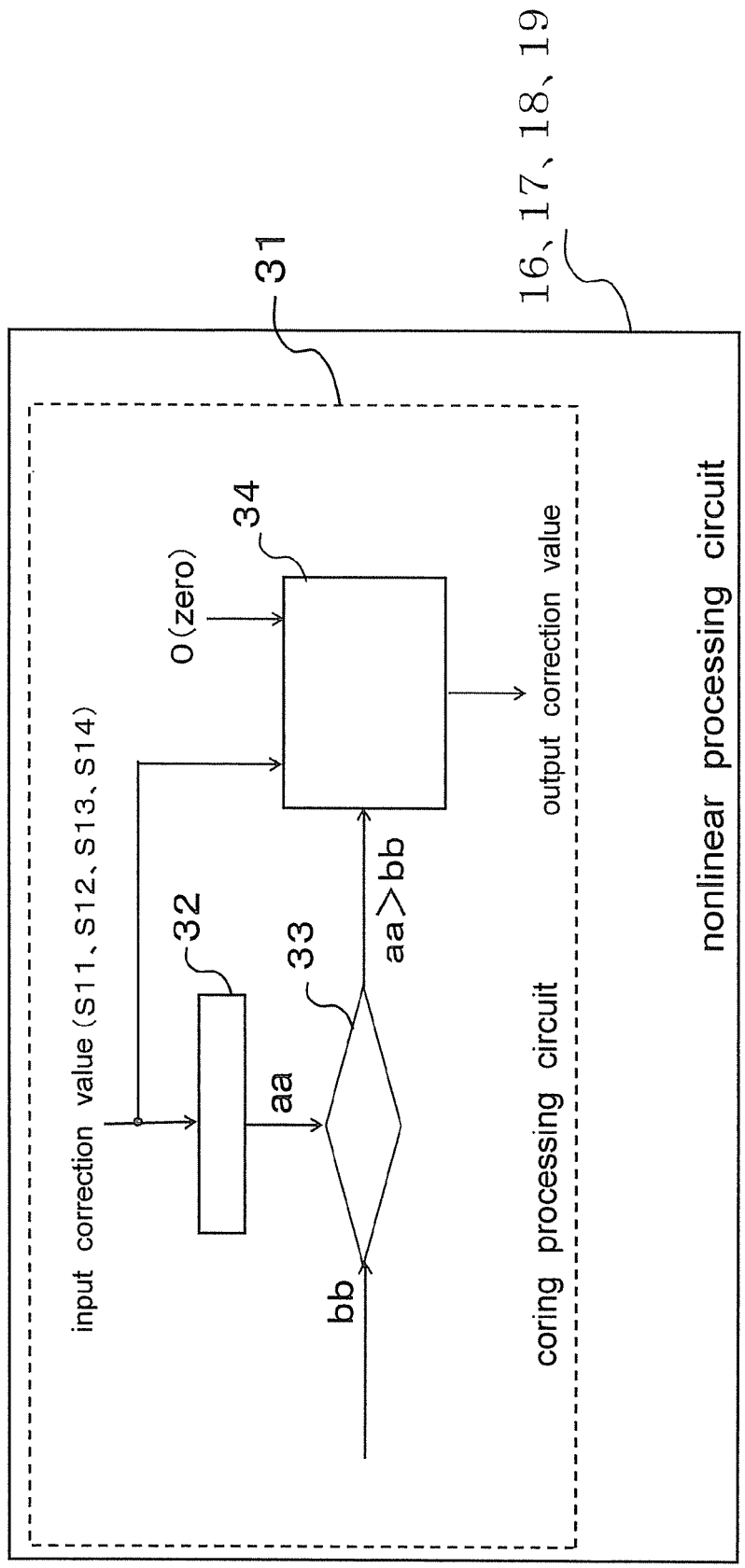
FIG. 18 is a block diagram showing a configuration of a nonlinear processing circuit according to the third embodiment of the invention.
Figure 19:
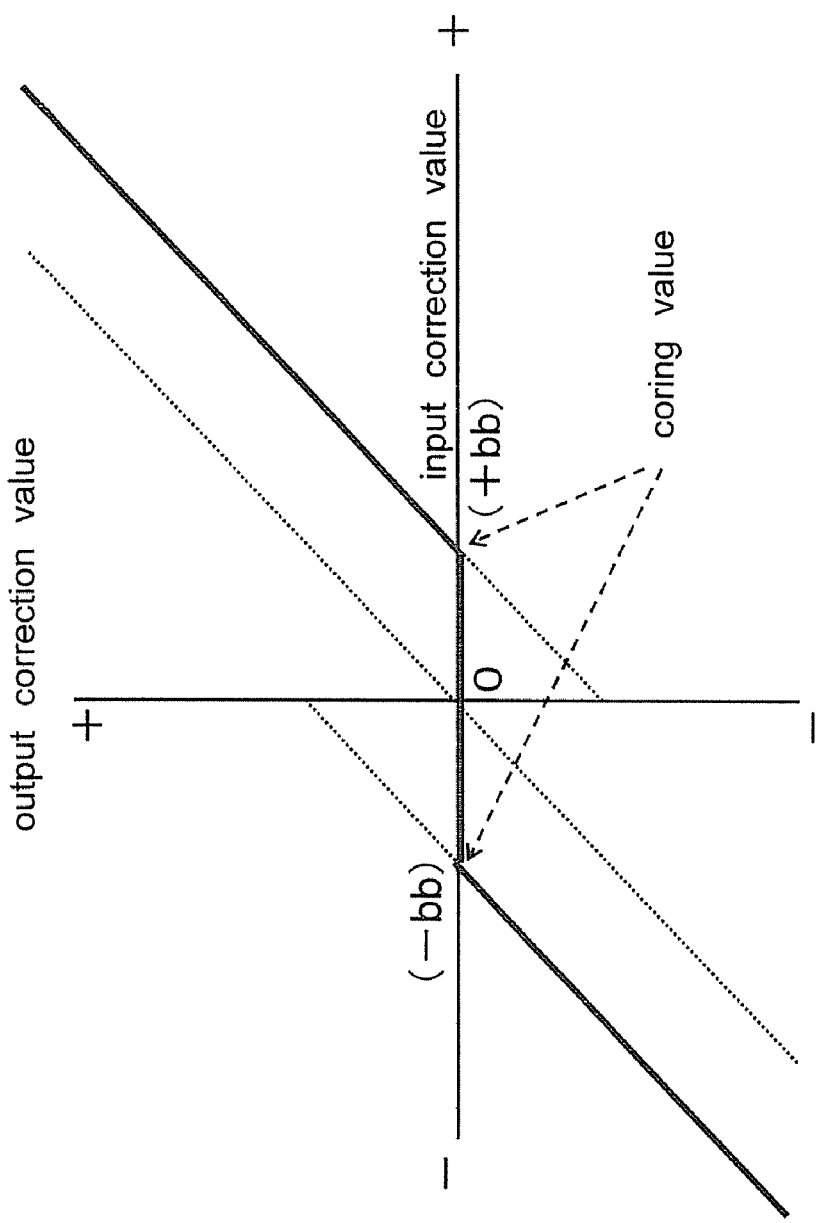
FIG. 19 is a graph showing a relationship between an input correction value and an output correction value after coring processing according to the third embodiment of the invention.

An image processing apparatus according to a third embodiment of the invention is described with reference to the drawings. FIG. 17 is a block diagram showing a configuration of an image quality adjusting circuit. FIG. 18 is a block diagram showing a configuration of a nonlinear processing circuit. FIG. 19 is a graph showing a relationship between an input correction value and an output correction value after coring processing. In the third embodiment, enhancement processing and coring processing are performed on an image.

In the following, the same components as those of the first embodiment are denoted by the same reference numerals. The description of the same components is omitted, and only different components are described.

As shown in FIG. 17, an image quality adjusting circuit 54a is provided with a line memory unit 1, a delay circuit unit 2, filter processing circuits 7 to 10, nonlinear processing circuits 16 to 19, and an adder 24. Though the delay circuit unit 2 has a 5×5 matrix arrangement, the arrangement may be changed to an m×n (where m and n are integers not less than 3) matrix form as appropriate.

Edge correction processing is performed by the line memory unit 1, the delay circuit unit 2, the filter processing circuits 7 to 10, the nonlinear processing circuits 16 to 19, and the adder 24. Specifically, filter processing is performed on inputted image data as enhancement processing, and coring processing is performed in such a manner that an output value is set to 0 (zero) when an input signal (in this case, a filter-processed image data signal) is not more than a predetermined value (specifically, a coring value).

In general, image data pieces are inputted serially, and the serially-inputted image pixels form noteworthy pixels sequentially. In order to generate an m×n matrix centered on a focus pixel, a frame memory and a delay circuit unit are used and edge correction processing is performed on the focus pixel and the pixels around the focus pixel.

The nonlinear processing circuit 16 is provided between the filter processing circuit 7 and the adder 24. The nonlinear processing circuit 16 receives a filter processing signal S11. The nonlinear processing circuit 16 performs the coring processing on the filter-processed image data, and outputs a nonlinear processing signal S21 to the adder 24.

The nonlinear processing circuit 17 is provided between the filter processing circuit 8 and the adder 24. The nonlinear processing circuit 17 receives a filter processing signal S12. The nonlinear processing circuit 17 performs the coring processing on the filter-processed image data, and outputs a nonlinear processing signal S22 to the adder 24.

The nonlinear processing circuit 18 is provided between the filter processing circuit 9 and the adder 24. The nonlinear processing circuit 18 receives a filter processing signal S13. The nonlinear processing circuit 18 performs the coring processing on the filter-processed image data, and outputs a nonlinear processing signal S23 to the adder 24.

The nonlinear processing circuit 19 is provided between the filter processing circuit 10 and the adder 24. The nonlinear processing circuit 19 receives a filter processing signal S14. The nonlinear processing circuit 19 performs the coring processing on the filter-processed image data, and outputs a nonlinear processing signal S24 to the adder 24.

The adder 24 receives an image data signal S1 of a focus pixel (the pixel of a delay circuit C2), and the nonlinear processing signal S21 to S24 subjected to the filter processing and the coring processing. The adder 24 performs addition of the image data on the focus pixel and the enhancement-processed image data. Consequently, edge-corrected image data obtained by the enhancement processing is outputted from the adder 24.

As shown in FIG. 18, the nonlinear processing circuits 16 to 19 are each provided with a coring processing circuit 31. The coring processing circuit 31 is provided with an absolute value definition circuit 32, a comparator 33, and a truth or falsehood selection circuit 34. The coring processing circuit 31 performs the coring processing.

The absolute value definition circuit 32 receives the image data on the corresponding one of the filter processing signals S11 to 14 as an input correction value. The absolute value definition circuit 32 generates an absolute value as of the input correction value. The comparator 33 receives a coring value bb, which is a register value to set a coring level, and the value as outputted from the absolute value definition circuit 32. The comparator 33 performs a comparison. The truth or falsehood selection circuit 34 receives the input correction value and the signal outputted from the comparator 33. The truth or falsehood selection circuit 34 sets an output value (output correction value) to 0 (zero) if the value as is not more than the coring value bb.

As shown in FIG. 19, in an area where the input correction value is not less than the coring value +bb, a fixed value is subtracted from the input correction value to thereby generate an output correction value which is proportional to the input correction value. In an area where the input correction value is between the positive coring value +bb and the negative coring value −bb, the output correction value is 0 (zero). In an area where the input correction value is not more than the coring value −bb, a fixed value is added to the input correction value to thereby generate an output correction value which is proportional to the input correction value.

Thus, by setting the input correction value (filter-processed image data) less than the positive coring value to 0 (zero) (the absolute value of the input correction value is compared with the positive coring value), contrast enhancement is performed only on an edge having a high contrast. Consequently, by not enhancing a small difference such as a noise, it is possible to enhance an edge of an image and prevent to enhance the noise.

As described above, in the image processing apparatus of the third embodiment, the image quality adjusting circuit 54a is provided with the line memory unit 1, the delay circuit unit 2, the filter processing circuits 7 to 10, the nonlinear processing circuits 16 to 19, and the adder 24. The image quality adjusting circuit 54a performs the filter processing on inputted image data in the horizontal, vertical, down-right, and down-left directions. After the filter processing, the image quality adjusting circuit 54a performs the coring process the horizontal, vertical, down-right, and down-left directions in such a manner that, if an input correction value is not more than a coring value, an output correction value is set to 0

(zero) whereas, if the input correction value is in an area of not less than the coring value, the output correction value is made smaller than the input correction value but proportional to the input correction value.

Accordingly, contrast enhancement is performed only on an edge having a high contrast. By not enhancing a small difference such as a noise, it is possible to enhance an edge of an image and prevent to enhance the noise.

In the third embodiment, when the input correction value is in an area of not less than the coring value, the output correction value is made smaller than the input correction value but proportional to the input correction value. However, in an area of not less than the coring value, the output correction value may be made just proportional to the input correction value.

Figure 20:
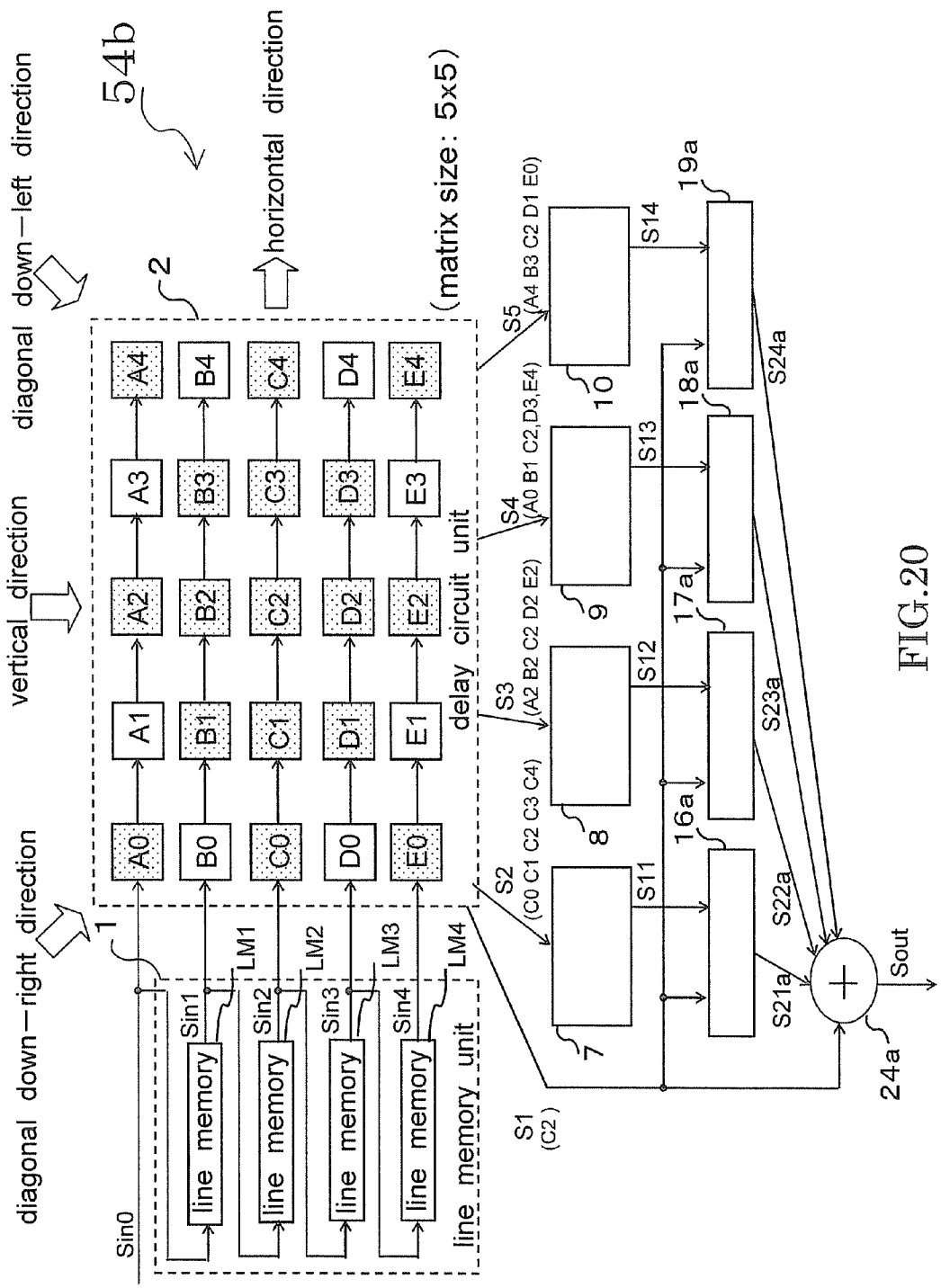
FIG. 20 is a block diagram showing a configuration of an image quality adjusting circuit according to a fourth embodiment of the invention.
Figure 21:
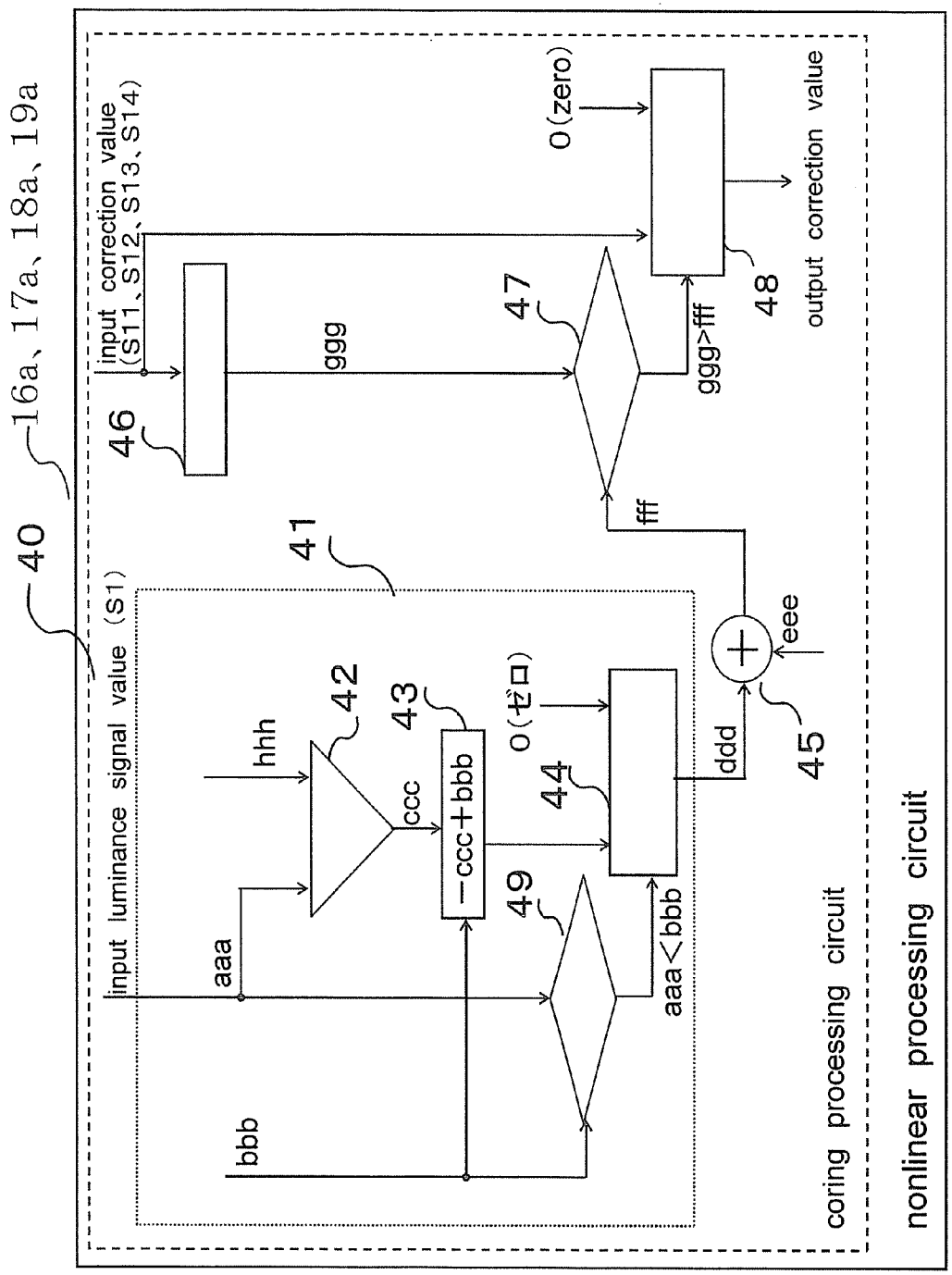
FIG. 21 is a block diagram showing a configuration of a nonlinear processing circuit according to the fourth embodiment of the invention.
Figure 22:
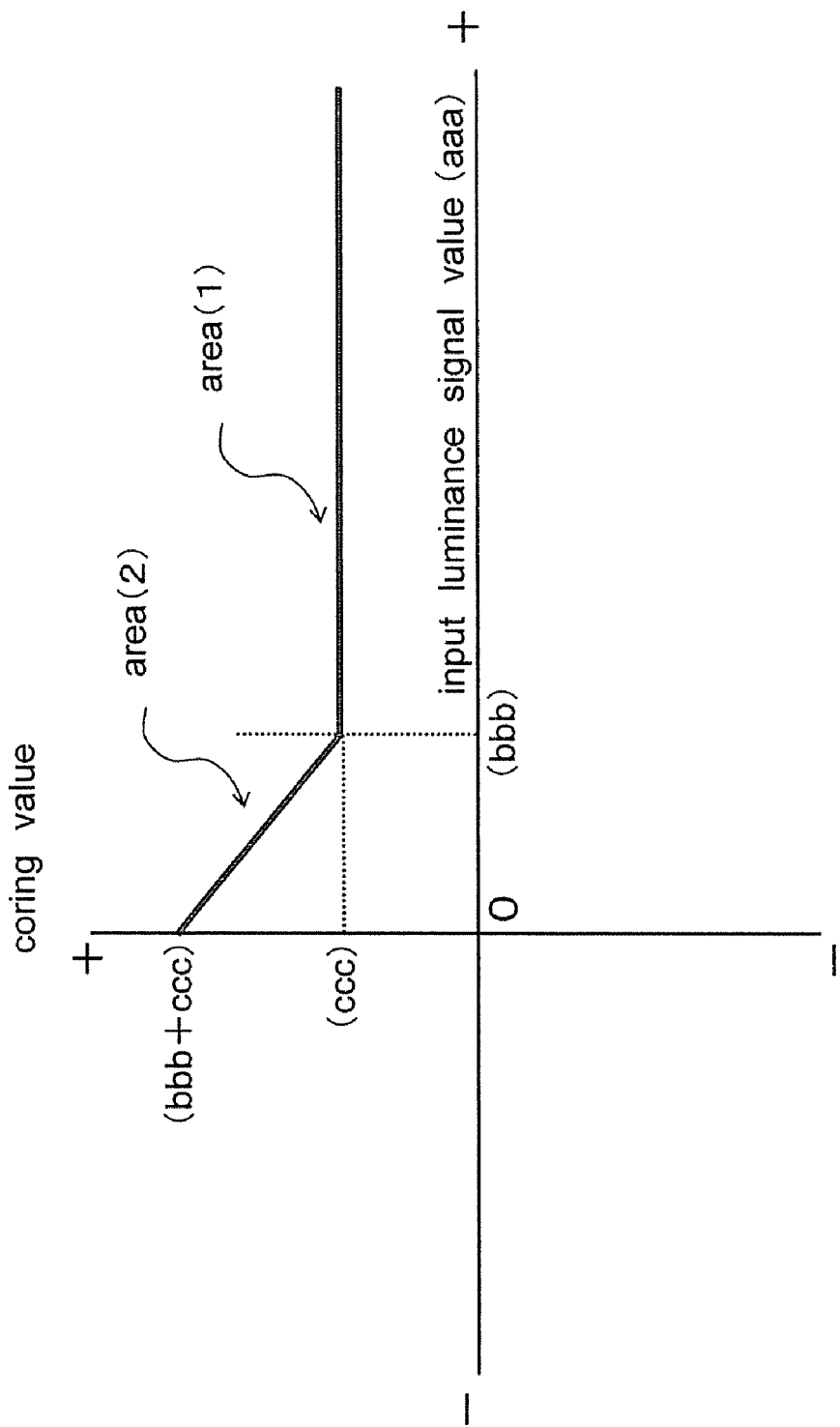
FIG. 22 is a graph illustrating coring processing according to the fourth embodiment of the invention.

An image processing apparatus according to a fourth embodiment of the invention is described with reference to the drawings. FIG. 20 is a block diagram showing a configuration of an image quality adjusting circuit. FIG. 21 is a block diagram showing a configuration of a nonlinear processing circuit. FIG. 22 is a graph illustrating coring processing. In the fourth embodiment, the nonlinear processing circuit receives an input luminance signal.

In the following, the same components as those of the third embodiment are denoted by the same reference numerals. The description of the same components is omitted, and only different components are described.

As shown in FIG. 20, an image quality adjusting circuit 54b is provided with a line memory unit 1, a delay circuit unit 2, filter processing circuits 7 to 10, nonlinear processing circuits 16a to 19a, and an adder 24a. Though the delay circuit unit 2 has a 5×5 matrix arrangement, the arrangement may be change to an m×n (where m and n are integers not less than 3) matrix as appropriate.

Edge correction processing is performed by the line memory unit 1, the delay circuit unit 2, the filter processing circuits 7 to 10, the nonlinear processing circuits 16a to 19a, and the adder 24a. Specifically, filter processing is performed on inputted image data as enhancement processing, and coring processing is performed in such a manner that a coring value is varied according to the luminance value of an input luminance signal and an output value is set to 0 (zero) depending on an input signal (a filter processing signal).

In general, image data pieces are inputted serially, and the serially-inputted image pixels form noteworthy pixels sequentially. In order to generate an m×n matrix centered on a focus pixel, a frame memory and a delay circuit unit are used and edge correction processing is performed on the focus pixel and the pixels around the focus pixel.

The nonlinear processing circuit 16a is provided between the filter processing circuit 7 and the adder 24a. The nonlinear processing circuit 16a receives a filter processing signal S11 and an image data signal S1 of a focus pixel (the pixel of a delay circuit C2). The nonlinear processing circuit 16a performs coring processing on the image data subjected to filter processing, and outputs a nonlinear processing signal S21a to the adder 24a.

The nonlinear processing circuit 17a is provided between the filter processing circuit 8 and the adder 24a. The nonlinear processing circuit 17a receives a filter processing signal S12 and the image data signal S1 of the focus pixel (the pixel of the delay circuit C2). The nonlinear processing circuit 17a performs coring processing on the image data subjected to filter processing, and outputs a nonlinear processing signal S22a to the adder 24a.

The nonlinear processing circuit 18a is provided between the filter processing circuit 9 and the adder 24a. The nonlinear processing circuit 18a receives a filter processing signal S13 and the image data signal S1 of the focus pixel (the pixel of the delay circuit C2). The nonlinear processing circuit 18a performs coring processing on the image data subjected to filter processing, and outputs a nonlinear processing signal S23a to the adder 24a.

The nonlinear processing circuit 19a is provided between the filter processing circuit 10 and the adder 24a. The nonlinear processing circuit 19a receives a filter processing signal S14 and the image data signal S1 of the focus pixel (the pixel of the delay circuit C2). The nonlinear processing circuit 19a performs coring processing on the image data subjected to filter processing, and outputs a nonlinear processing signal S24a to the adder 24a.

The adder 24a receives the image data signal S1 of the focus pixel (the pixel of the delay circuit C2), and the nonlinear processing signals S21a to S24a subjected to the filter processing and the coring processing. The adder 24a performs addition of the image data on the focus pixel and the coring-processed image data. Consequently, edge-corrected image data obtained by the enhancement processing is outputted from the adder 24a.

As shown in FIG. 21, the nonlinear processing circuits 16a to 19a are each provided with a coring processing circuit 40. The coring processing circuit 40 is provided with an additional correction value processing circuit 41, an adder 45, an absolute value definition circuit 46, a comparator 47, and a truth or falsehood selection circuit 48. The additional correction value processing circuit 41 is provided with a multiplier 42, a subtracter 43, a truth or falsehood selection circuit 44, and a comparator 49.

The coring processing circuit 40 performs the coring processing while varying a coring value in accordance with the luminance value of an input luminance signal. Here, the image data signal S1 of the focus pixel is used as an input luminance signal; however, a luminance value determined from an area centered on the focus pixel may alternatively be used.

The multiplier 42 receives a register value hhh to set the amount of variation in coring value, and an input luminance signal value aaa. The multiplier 42 generates a value ccc obtained by multiplication of the two values. The subtracter 43 receives a value bbb to set a luminance to change the corresponding coring value, and the value ccc obtained by the multiplication. The Subtracter 43 performs subtraction of the value ccc from the value bbb. The comparator 49 receives the input luminance signal value aaa and the value bbb. The comparator 49 performs a comparison. The truth or falsehood selection circuit 44 receives the subtraction processing signal of the subtracter 43 and the signal outputted from the comparator 49. The truth or falsehood selection circuit 44 performs truth or falsehood selection and outputs a resultant value ddd. The adder 45 receives a value eee to set a coring value and the value ddd. The adder 45 generates a coring value fff by performing addition of the two values.

As shown in FIG. 22, the coring value fff is varied according to the input luminance signal value aaa. Specifically, the coring value fff takes a constant value ccc in an area (1) where the input luminance signal value aaa is not less than the value bbb. The coring value fff monotonously increases as the input luminance signal value aaa decreases, in an area (2) where the input luminance signal value aaa is not more than the value bbb. The coring value fff takes the highest value (bbb+ccc) when the input luminance signal value aaa is 0 (zero).

When the value hhh is 1, for example, the coring value in the area (2) has a slope of −1. When the value hhh is ½, the coring value in the area (2) has a slope of −½.

The absolute value definition circuit 46 receives the image data on the corresponding one of the filter processing signals S11 to 14 as an input correction value. The absolute value definition circuit 46 generates an absolute value ggg of the input correction value. The comparator 47 receives the value fff (variable coring value) outputted from the adder 45 and the value ggg outputted from the absolute value definition circuit 46. The comparator 47 performs a comparison. The truth or falsehood selection circuit 48 receives the input correction value and the signal outputted from the comparator 47. The truth or falsehood selection circuit 48 sets the output value (output correction value) to 0 (zero) if the value ggg is not more than the coring value fff (variable coring value).

The coring value in the area (2) where the input luminance signal value aaa is relatively low, gradually increases so as to be larger than the coring value in the area (1) where the input luminance signal value aaa is relatively high, and then coring processing is performed on the corresponding one of the filter-processed input correction values (S11 to S14). As a result, in an area where the input luminance signal is low, by not enhancing a small difference such as a noise, it is possible to enhance an edge of an image and prevent to enhance the noise more than that of the third embodiment.

As described above, in the image processing apparatus according to the fourth embodiment, the image quality adjusting circuit 54b is provided with the line memory unit 1, the delay circuit unit 2, the filter processing circuits 7 to 10, the nonlinear processing circuits 16a to 19a, and the adder 24a. The image quality adjusting circuit 54b performs filter processing on inputted image data in the horizontal, vertical, down-right, and down-left directions. The image quality adjusting circuit 54b generates a variable coring value which gradually increases in an area where an input luminance signal value is low. After the filter processing, the image quality adjusting circuit 54b performs coring processing in the horizontal, vertical, down-right, and down-left directions in such a manner that, if an input correction value is not more than the variable coring value, the output correction value is set to 0 (zero) whereas, if the input correction value is in an area of not less than the variable coring value, the output correction value is made smaller than the input correction value but proportional to the input correction value.

Accordingly, contrast enhancement is performed only on an edge having a high contrast. By not enhancing a small difference such as a noise, it is possible to enhance an edge of an image and prevent to enhance the noise. As the noise dose not increase, this makes it possible to provide an image which has an enhanced edge and is much clearer than that of the third embodiment.

In the fourth embodiment, in the area where an input correction value is not less than the variable coring value, an output correction value is made smaller than the input correction value but proportional to the input correction value. However, in the area of not less than the variable coring value, the output correction value may be just proportional to the input correction value.

Figure 23:
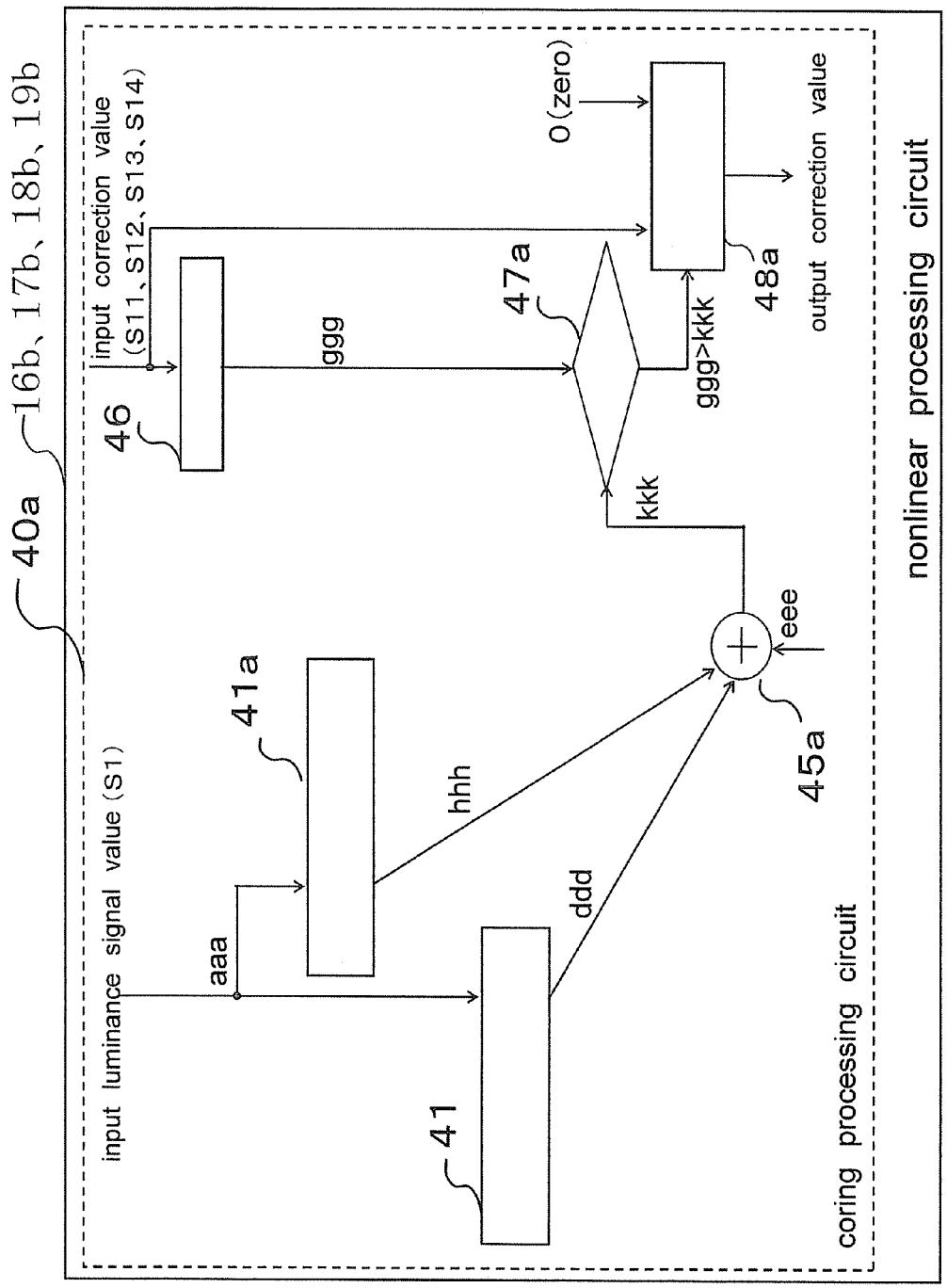
FIG. 23 is a block diagram showing a configuration of a nonlinear processing circuit according to a fifth embodiment of the invention.
Figure 24:
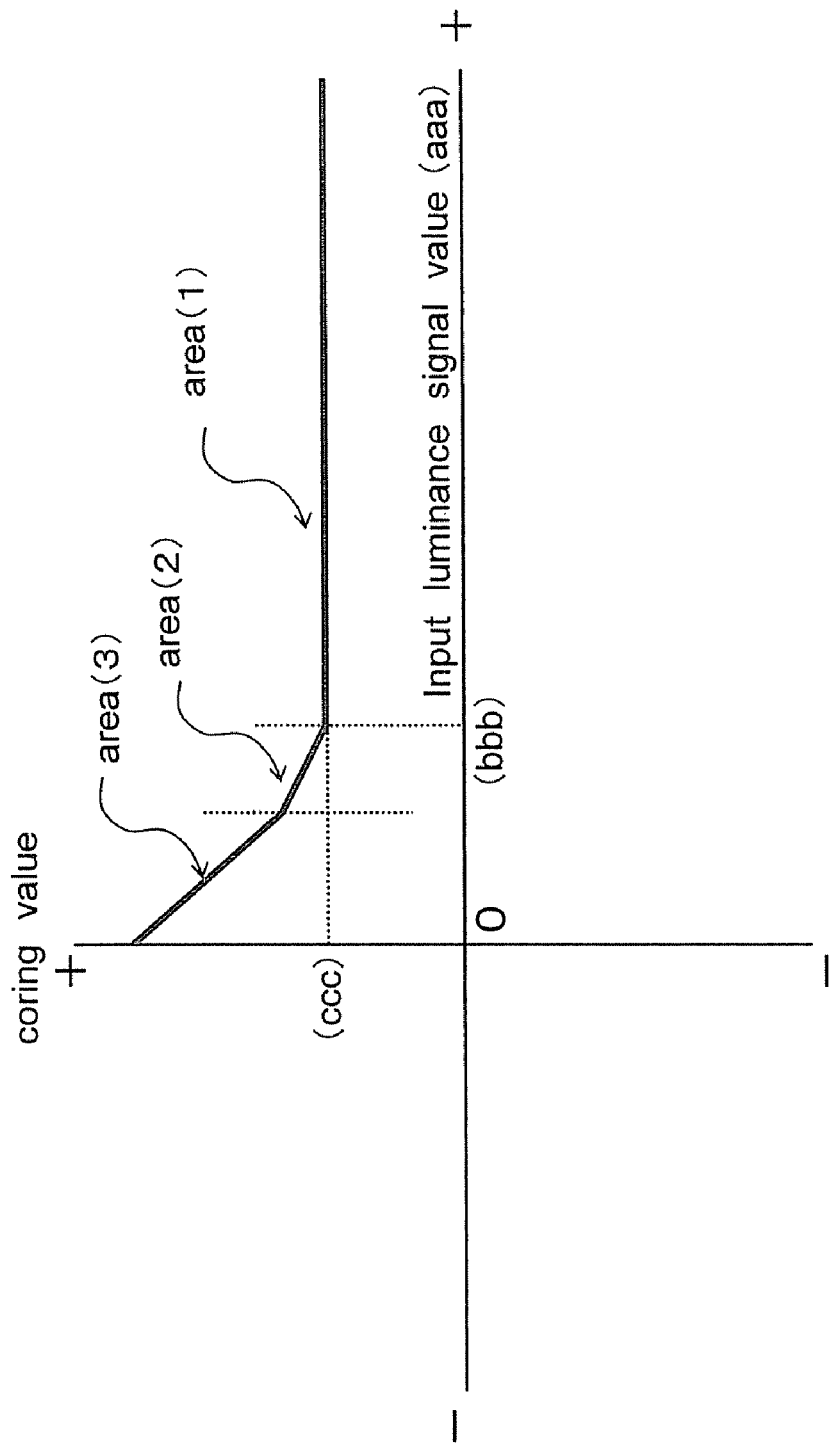
FIG. 24 is a graph illustrating coring processing according to the fifth embodiment of the invention.

An image processing apparatus according to a fifth embodiment of the invention is described with reference to the drawings. FIG. 23 is a block diagram showing a configuration of a nonlinear processing circuit. FIG. 24 is a graph illustrating coring processing. In the fifth embodiment, the number of additional correction value processing circuits provided in the nonlinear processing circuit is increased.

In the following, the same components as those of the fourth embodiment are denoted by the same reference numerals. The description of the same components is omitted, and only different components are described.

As shown in FIG. 23, nonlinear processing circuits 16b to 19b are each provided with a coring processing circuit 40a. The coring processing circuit 40a is provided with an additional correction value processing circuit 41, an additional correction value processing circuit 41a, an adder 45a, an absolute value definition circuit 46, a comparator 47a, and a truth or falsehood selection circuit 48a. An image quality adjusting circuit of the fifth embodiment has the same configuration as that of the fourth embodiment except for the nonlinear processing circuits 16b to 19b.

The coring processing circuit 40a performs coring processing while varying a coring value in accordance with the luminance value of an input luminance signal. Here, an image data signal S1 of a focus pixel is used as an input luminance signal; however, a luminance value determined from an area centered on the focus pixel may alternatively be used.

The additional correction value processing circuit 41a receives an input luminance signal value aaa. The additional correction value processing circuit 41a generates a coring value which stays constant in an area where the input luminance signal value aaa is relatively high. The additional correction value processing circuit 41a generates the coring value, which also increases gradually in an area where the input luminance signal value aaa is not more than a predetermined value, and outputs a variable value hhh (similar operation to the additional correction value processing circuit 41). The adder 45a receives a value ddd and the value hhh. The adder 45a generates a coring value kkk by performing addition of the two values.

As shown in FIG. 24, the coring value kkk is varied according to the input luminance signal value aaa. Specifically, in an area (1) where the input luminance signal value aaa is not less than a value bbb, the coring value kkk takes a constant value ccc. In an area (2) where the input luminance signal value aaa is not more than value bbb, the coring value kkk increases as the input luminance signal value aaa decreases. In an area (3) where the input luminance signal value aaa is even smaller than that in the area (2), the coring value kkk increases more rapidly as the input luminance signal value aaa decreases. The coring value kkk takes the highest value when the input luminance signal value aaa is 0 (zero).

The comparator 47a receives the value kkk (variable coring value) outputted from the adder 45a and a value ggg outputted from the absolute value definition circuit 46. The comparator 47a performs a comparison. The truth or falsehood selection circuit 48a receives an input correction value and the signal outputted from the comparator 47a. The truth or falsehood selection circuit 48a sets an output value (output correction value) to 0 (zero) if the value ggg is not more than the coring value kkk (variable coring value).

The coring value in the area (2) where the input luminance signal value aaa is relatively low, gradually increases so as to be larger than the coring value in the area (1) where the input luminance signal value aaa is relatively high. The coring value in the area (3) where the input luminance signal value aaa is smaller increases more rapidly than in the area (2). Then, coring processing is performed on the corresponding one of the filter-processed input correction values (S11 to S14). As a result, in an area where the input luminance signal is low, it is possible to prevent to enhance a noise and enhance an edge of the noise so that provide an image much clearer than that of the fourth embodiment.

As described above, the nonlinear processing circuits 16b to 19b of the image processing apparatus according to the fifth embodiment are each provided with the coring processing circuit 40a. The coring processing circuit 40a is provided with the additional correction value processing circuit 41, the additional correction value processing circuit 41a, the adder 45a, the absolute value definition circuit 46, the comparator 47a, and the truth or falsehood selection circuit 48a. In the coring processing circuit 40a, a constant coring value is generated in the area (1) where the luminance value of an input luminance signal is relatively high. A gradually increasing coring value is generated in the area (2) where the luminance value of an input luminance signal is smaller. A coring value which increases more rapidly than in the area (2) is generated in the area (3) where the luminance value of an input luminance signal is even smaller.

Accordingly, contrast enhancement is performed only an edge having a high contrast. By not enhancing a small difference such as a noise, it is possible to enhance an edge of an image and prevent to enhance the noise. This makes it possible to provide an image which has an enhanced edge and is much clearer than that of the fourth embodiment.

In the fifth embodiment, the additional correction value processing circuit 41 and 41a are provided; however, 3 or more additional correction value processing circuits may be provided.

Figure 25:
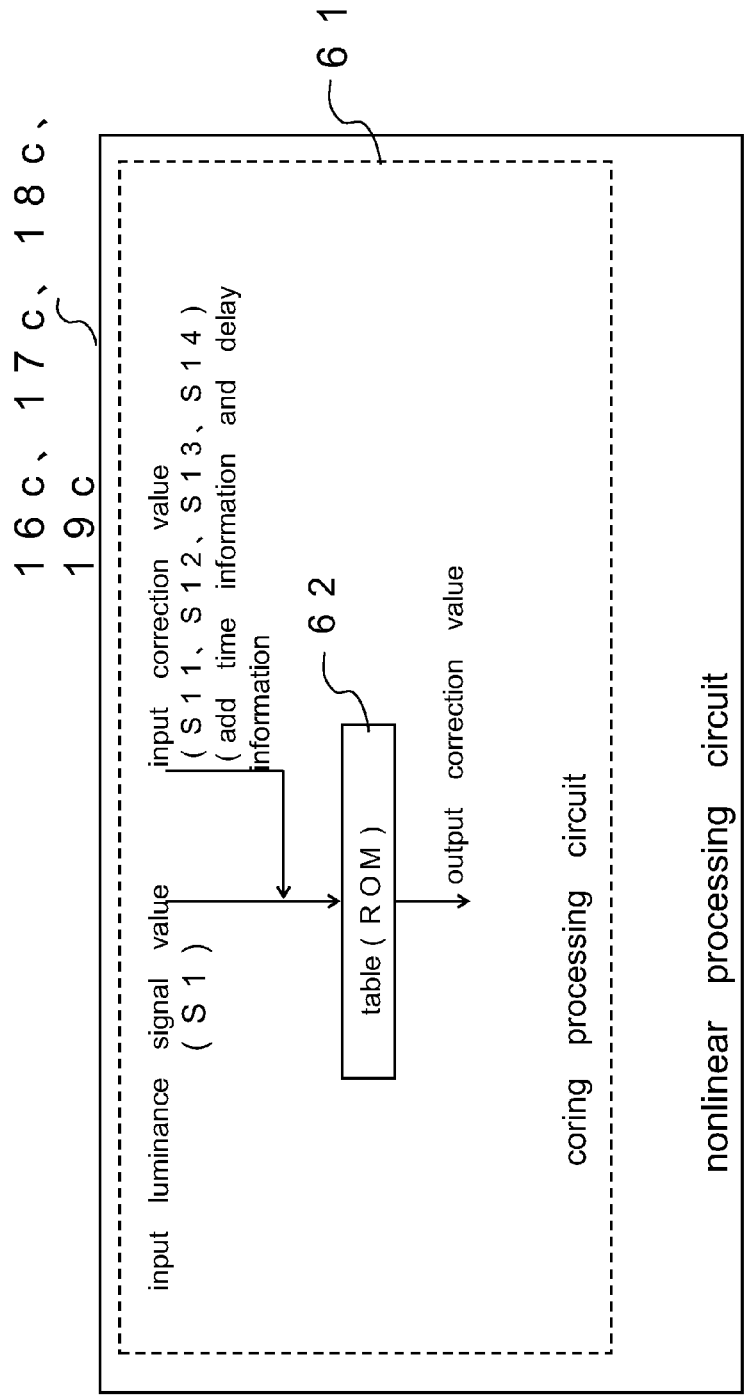
FIG. 25 is a diagram showing coring processing using a table according to a sixth embodiment of the invention.
Figure 26:
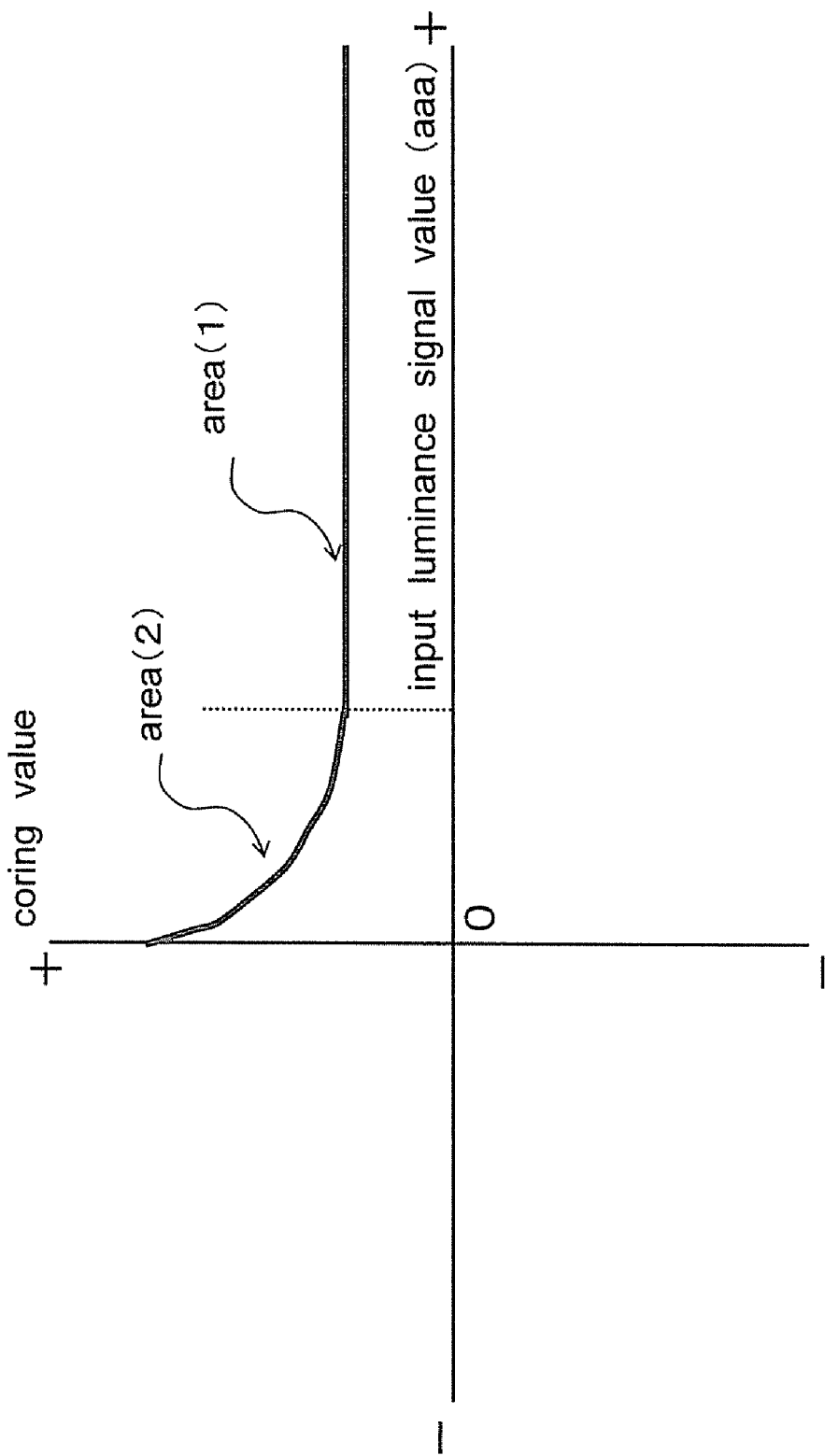
FIG. 26 is a graph illustrating the coring processing according to the sixth embodiment of the invention.

An image processing apparatus according to a sixth embodiment of the invention is described with reference to the drawings. FIG. 25 is a block diagram showing coring processing using a table. FIG. 26 is a graph illustrating the coring processing. In the sixth embodiment, coring processing is performed using a table.

As shown in FIG. 25, nonlinear processing circuits 16c to 19c are each provided with a coring processing circuit 61. The coring processing circuit 61 is provided with a table (ROM) 62. The image quality adjusting circuit of the sixth embodiment has the same configuration as that of the fourth embodiment except for the nonlinear processing circuits 16c to 19c.

In the coring processing circuit 61, predetermined values have been stored as a table in a ROM. An input luminance signal and a filter-processed input correction value are inputted in the table (ROM) 62 and a value which has been stored in the table is selected as a coring value. Here, information on time required to access the ROM and delay information corresponding to the time are added to the input correction value.

As shown in FIG. 26, the coring value is varied according to an input luminance signal value aaa. Specifically, in an area (1) where the input luminance signal value aaa is not less a predetermined value, the coring value takes a constant value. In an area (2) where the input luminance signal value aaa is not more than the predetermined value, the coring value increases as the input luminance signal value aaa decreases. Since a number of optimal coring values are stored in the table (ROM) 62, the characteristic of the graph in the area (2) of not more than the predetermined value exhibits a smooth curve.

As described above, the nonlinear processing circuits 16c to 19c of the image processing apparatus of the sixth embodiment are each provided with the coring processing circuit 61. The coring processing circuit 61 is provided with the table (ROM) 62. In the coring processing circuit 61, a constant coring value is generated in the area (1) where the luminance value of an input luminance signal is relatively high, and a gradually increasing coring value along a smooth curve is generated in the area (2) where the luminance value of an input luminance signal is smaller.

Accordingly, contrast enhancement is performed only on an edge having a high contrast, thereby enabling to remove a noise due to a low level signal in high frequency components. This makes it possible to provide an image which has an enhanced edge and is much clearer than that of the fifth embodiment.

Figure 27:
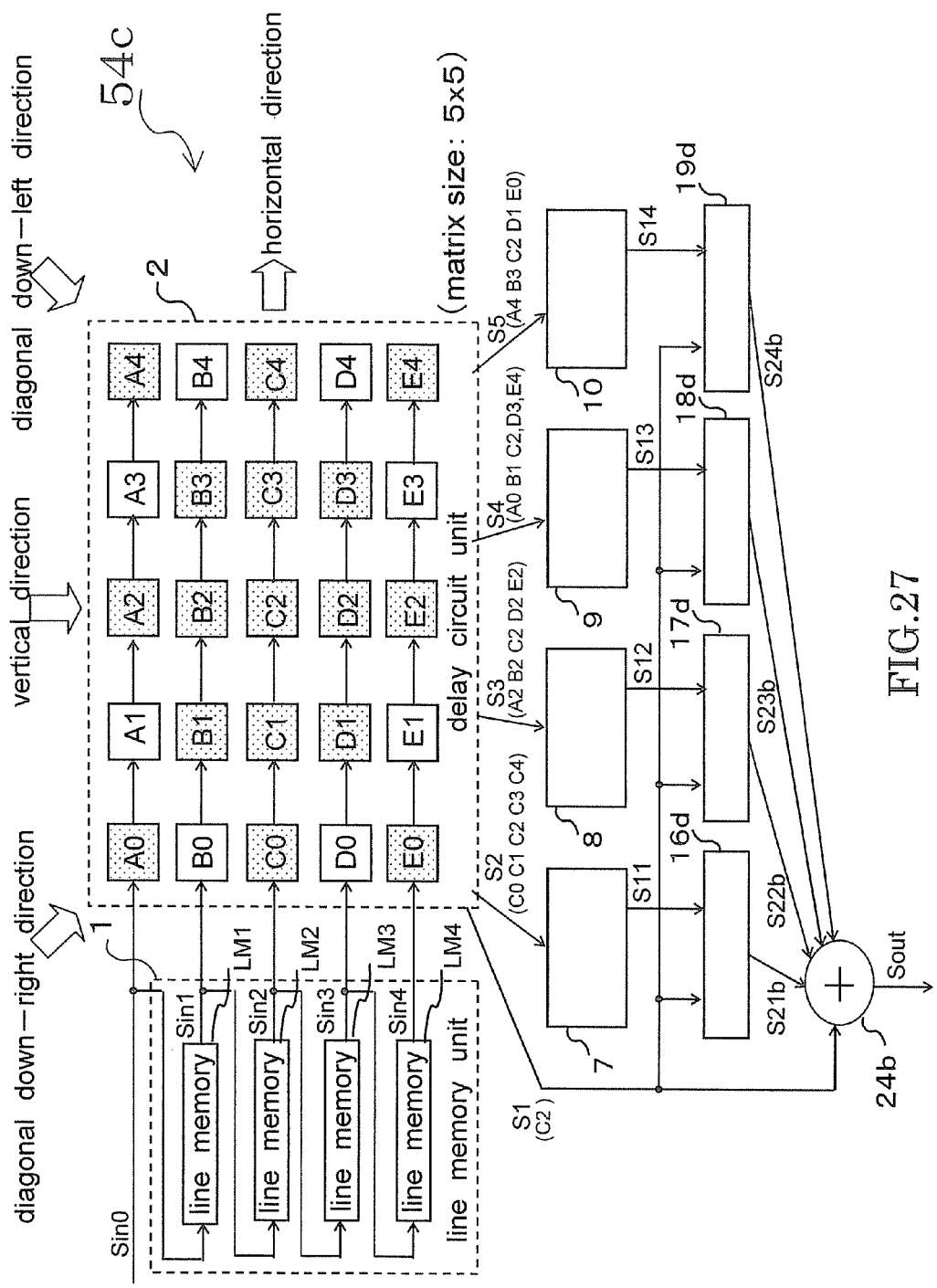
FIG. 27 is a block diagram showing a configuration of an image quality adjusting circuit according to a seventh embodiment of the invention.
Figure 28:
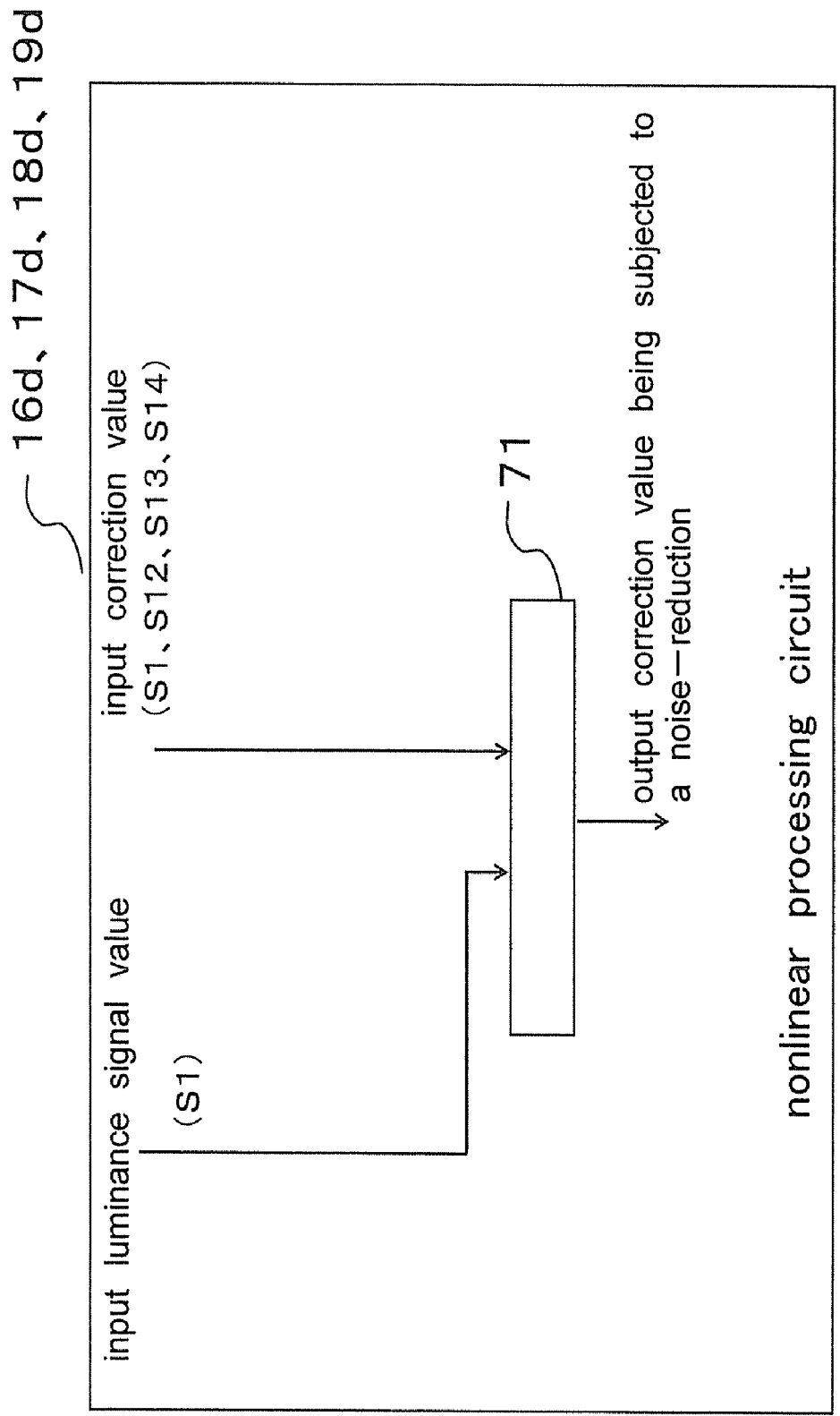
FIG. 28 is a block diagram showing a configuration of a nonlinear processing circuit according to the seventh embodiment of the invention.

An image processing apparatus according to a seventh embodiment of the invention is described with reference to the drawings. FIG. 27 is a block diagram showing a configuration of an image quality adjusting circuit. FIG. 28 is a block diagram showing a configuration of a nonlinear processing circuit. In the seventh embodiment, noise reduction processing is performed after filter processing.

In the following, the same components as those of the fourth embodiment are denoted by the same reference numerals. The description of the same components is omitted, and only different components are described.

As shown in FIG. 27, an image quality adjusting circuit 54c is provided with a line memory unit 1, a delay circuit unit 2, filter processing circuits 7 to 10, nonlinear processing circuits 16d to 19d, and an adder 24b.

Edge correction processing is performed by the line memory unit 1, the delay circuit unit 2, the filter processing circuits 7 to 10, the nonlinear processing circuits 16d to 19d, and the adder 24b. Specifically, filter processing is performed on inputted image data, and then noise reduction processing is performed.

In general, image data pieces are inputted serially, and the serially-inputted image pixels form noteworthy pixels sequentially. In order to generate an m×n matrix centered on a focus pixel, a frame memory and a delay circuit unit are used to perform edge correction processing on the focus pixel and the pixels around the focus pixel.

The nonlinear processing circuit 16d is provided between the filter processing circuit 7 and the adder 24b. The nonlinear processing circuit 16d receives a filter processing signal S11 and an image data signal S1 of a focus pixel (the pixel of a delay circuit C2). The nonlinear processing circuit 16d performs noise reduction processing on image data subjected to filter processing, and outputs a nonlinear processing signal S21b to the adder 24b.

The nonlinear processing circuit 17d is provided between the filter processing circuit 8 and the adder 24b. The nonlinear processing circuit 17d receives a filter processing signal S12 and the image data signal S1 of the focus pixel (the pixel of the delay circuit C2). The nonlinear processing circuit 17d performs noise reduction processing on image data subjected to filter processing, and outputs a nonlinear processing signal S22b to the adder 24b.

The nonlinear processing circuit 18d is provided between the filter processing circuit 9 and the adder 24b. The nonlinear processing circuit 18d receives a filter processing signal S13 and the image data signal S1 of the focus pixel (the pixel of the delay circuit C2). The nonlinear processing circuit 18d performs noise reduction processing on image data subjected to filter processing, and outputs a nonlinear processing signal S23b to the adder 24b.

The nonlinear processing circuit 19d is provided between the filter processing circuit 10 and the adder 24b. The nonlinear processing circuit 19d receives a filter processing signal S14 and the image data signal S1 of the focus pixel (the pixel of the delay circuit C2). The nonlinear processing circuit 19d performs noise reduction processing on image data subjected to the filter processing, and outputs a nonlinear processing signal S24b to the adder 24b.

The adder 24b receives the image data signal S1 of the focus pixel (the pixel of the delay circuit C2), and the nonlinear processing signals S21b to S24b subjected to the filter processing and the noise reduction processing. The adder 24b performs addition of the image data on the focus pixel and the image data subjected to the filter processing and the noise reduction processing. Consequently, edge-corrected image data obtained by the enhancement processing is outputted from the adder 24b.

As shown in FIG. 28, the nonlinear processing circuits 16d to 19d are each provided with a noise reduction processing circuit 71. The noise reduction processing circuit 71 receives an input luminance signal value and an input correction value. The noise reduction processing circuit 71 generates a noise reduction processing correction value varying according to the luminance value of an input luminance signal. The noise reduction processing circuit 71 performs the noise reduction processing on filter-processed input correction value on the basis of the varied noise reduction processing correction value, and thereby generates a noise-corrected output correction value.

Figure 29:
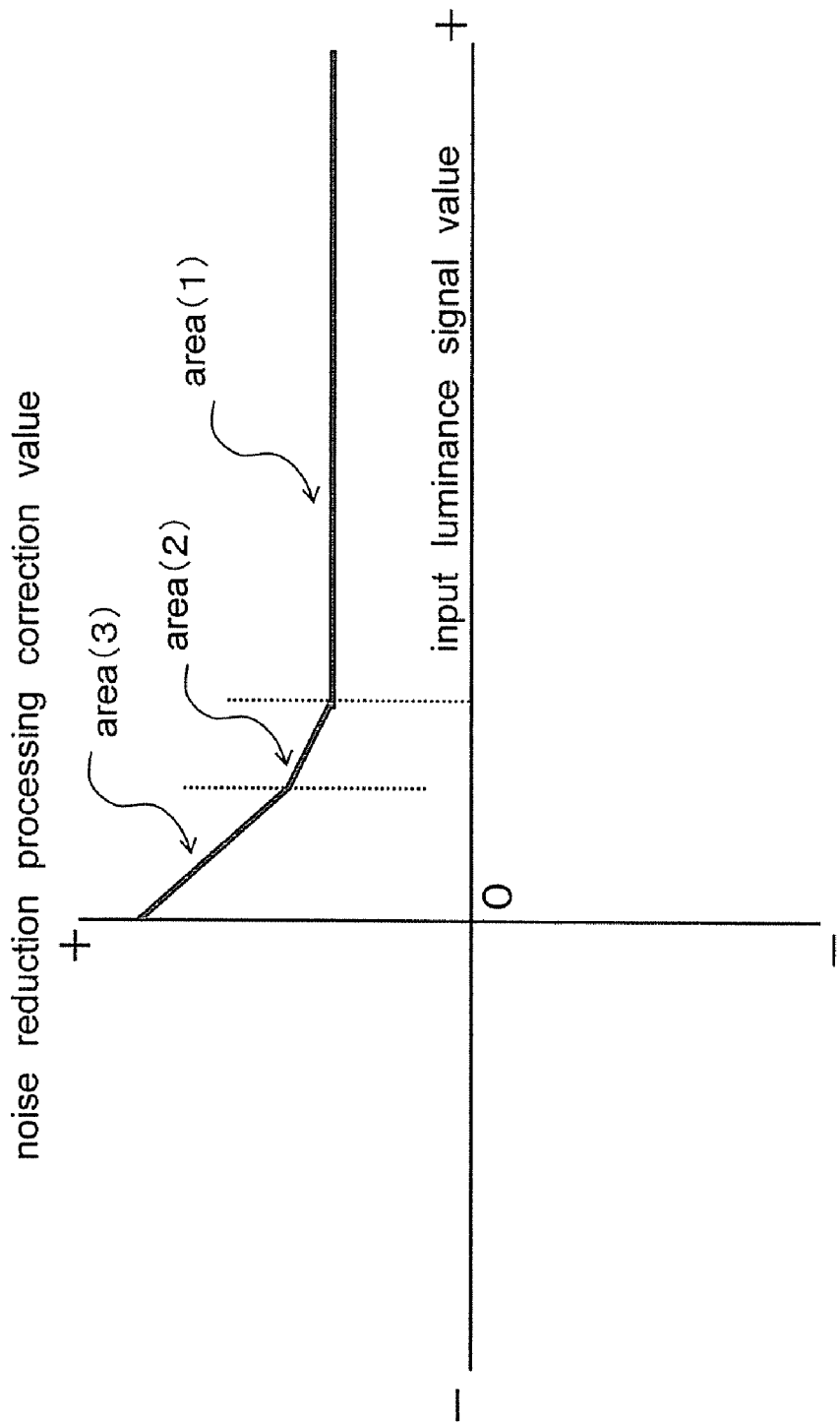
FIG. 29 is a graph illustrating noise reduction processing correction according to the seventh embodiment of the invention.
Figure 30:
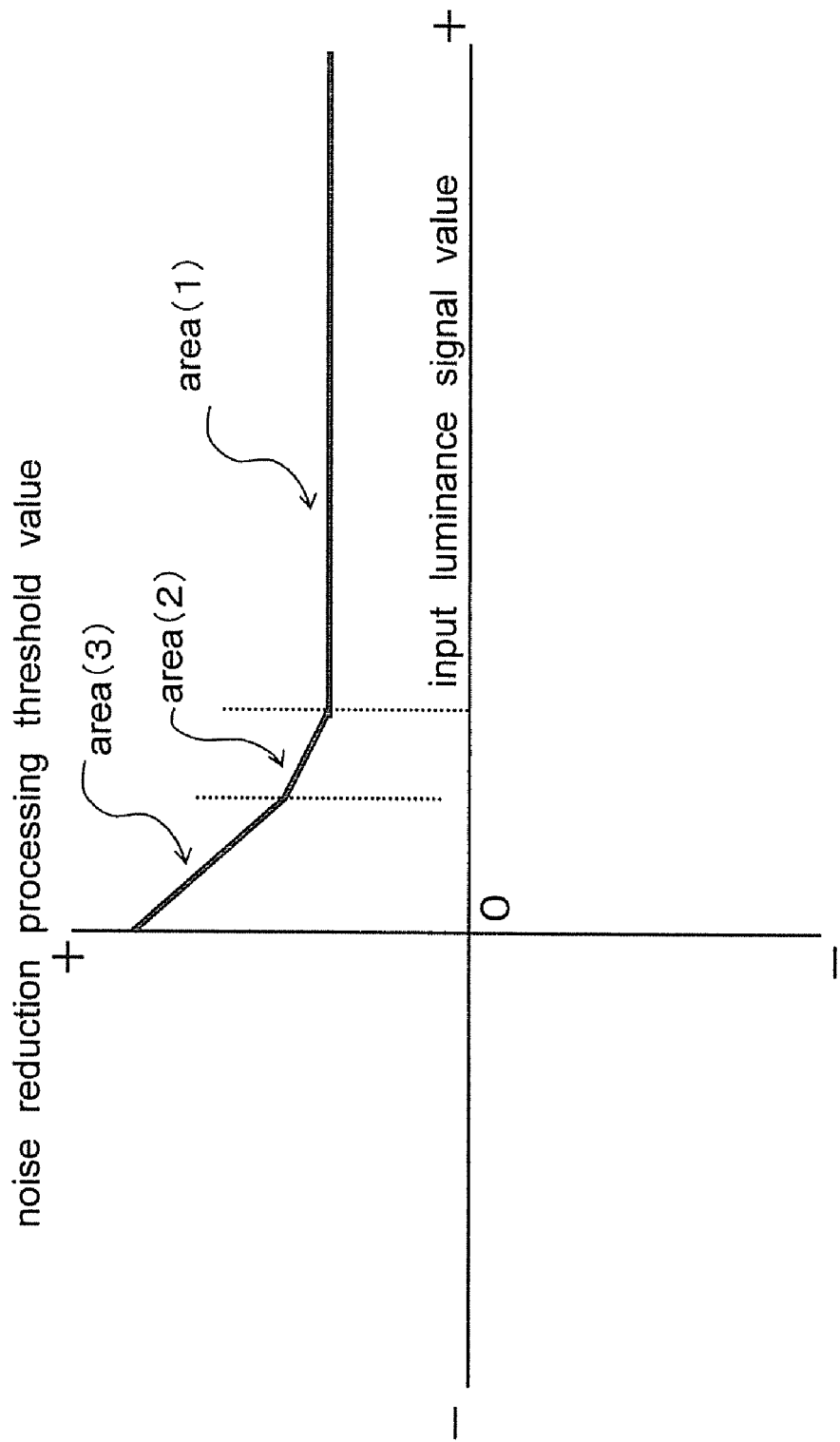
FIG. 30 is a graph illustrating a noise reduction processing threshold value according to the seventh embodiment of the invention.
Figure 31:
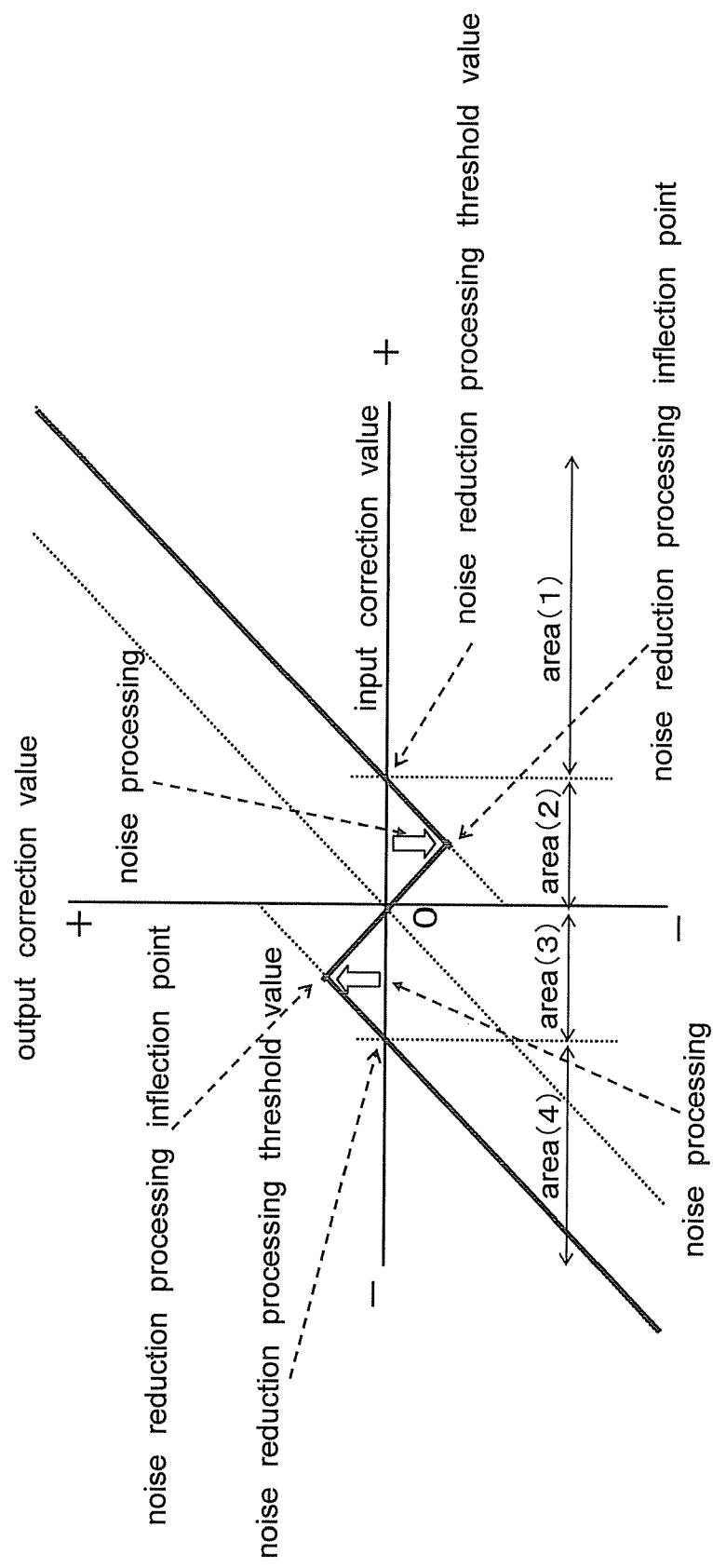
FIG. 31 is a graph showing a relationship between an input correction value and an output correction value after noise reduction processing according to the seventh embodiment of the invention.
Figure 32:
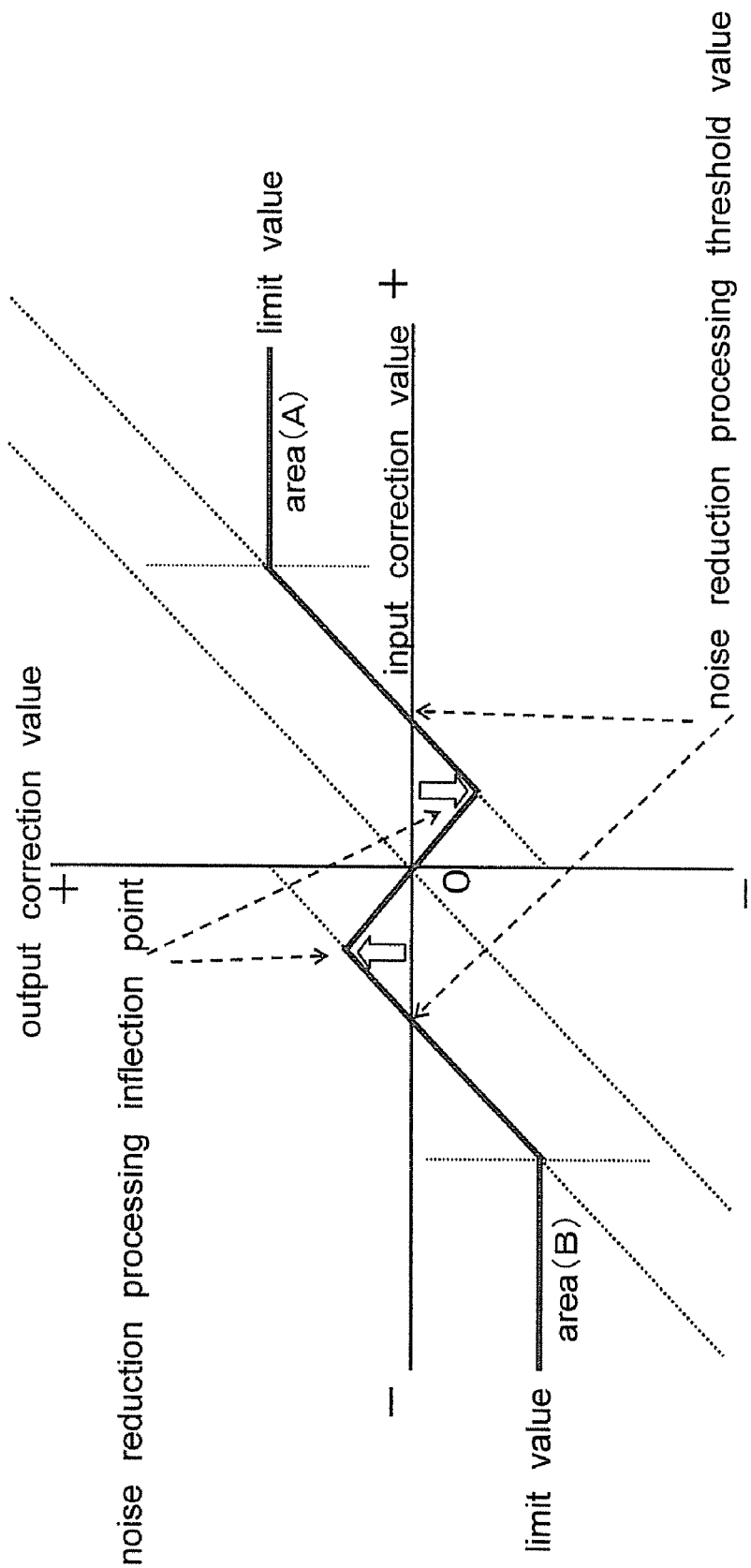
FIG. 32 is a graph showing another relationship between the input correction value and the output correction value after the noise reduction processing according to the seventh embodiment of the invention.
Figure 33:
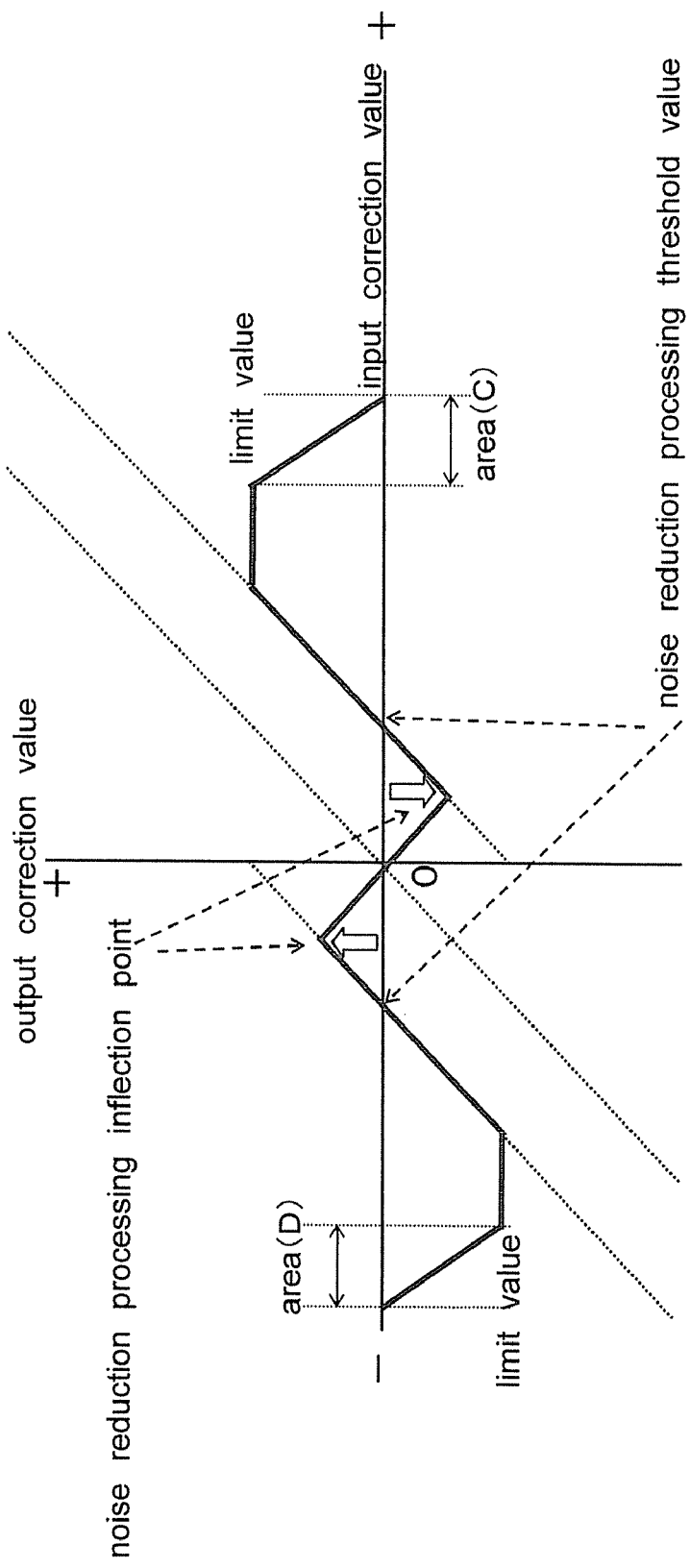
FIG. 33 is a graph showing another relationship between the input correction value and the output correction value after the noise reduction processing according to the seventh embodiment of the invention.

Next, the noise reduction processing is described with reference to FIGS. 29 to 33. FIG. 29 is a graph illustrating the noise reduction processing correction. FIG. 30 is a graph illustrating noise reduction processing threshold values. FIGS. 31 to 33 are graphs each illustrating a relationship between an input correction value and an output correction value after the noise reduction processing.

As shown in FIG. 29, in an area (1) where the input luminance signal value is not less than a predetermined value, the noise reduction processing correction value stays constant. In an area (2) where the input luminance signal value is not more than the predetermined value, the noise reduction processing correction value increases as the input luminance signal value decreases. In an area (3) where the input luminance signal value is smaller than in the area (2), the noise reduction processing correction value increases more rapidly as the input luminance signal value decreases. The noise reduction processing correction value is highest when input luminance signal value is 0 (zero).

By performing the noise reduction processing, edge smoothing and noise reduction for a dark portion of an image can be enhanced and the edge contrast of a bright portion of the image can be enhanced. As shown in FIG. 30, a noise reduction processing threshold value may be varied according to the input luminance signal value. This case also provides similar effects to those of the case where the noise reduction processing correction value is varied.

Regarding the characteristic of the noise reduction processing using the nonlinear processing circuits 16d to 19d, as shown in FIG. 31, the output correction value is proportional to the input correction value (the output correction value is relatively smaller than the input correction value), in an area (1) where the input correction value is not less than a first predetermined value (positive), which is the noise reduction processing threshold value. In an area (2) where the input correction value is between 0 (zero) and the first predetermined value (positive), the output correction value has a sign opposite to that of the input correction value, and takes the lowest value at a noise reduction processing inflection point. The output correction value takes 0 (zero) when the input correction value is at the first predetermined value (positive), and takes 0 (zero) again when the input correction value is at 0 (zero). In an area (3) where the input correction value is between 0 (zero) and a second predetermined value (negative), the output correction value has a sign opposite to that of the input correction value, and takes the highest value at another noise reduction processing inflection point. The output correction value takes 0 (zero) when the input correction value is at the second predetermined value (negative), and takes 0 (zero) when the input correction value is at 0 (zero). In an area (4) where the input correction value is not more than the second predetermined value (negative), the output correction value is proportional to the input correction value, but the output correction value is relatively larger than the input correction value.

In the noise reduction processing, limiter processing may be performed on the output correction value as appropriate. The drawing and description of specific circuits to implement the limiter processing are omitted.

As shown in FIG. 32, for example, the output correction value is set to a constant value (limit value) in an area (A) where the input correction value is not less than the first predetermined value (positive), and the output correction value is set to another constant value (limit value) in an area (B) where the input correction value is not more than the second predetermined value (negative). By performing such limiter processing, correction of image data by the noise reduction processing is not performed more than necessary, whereby the image can be prevented from becoming unnatural. The limiter processing is also effective in filter processing and coring processing.

As shown in FIG. 33, the positive and negative limit values of the input correction value may be changed. For example, there may be provided an area (C) where the positive limit value of the input correction value gradually decreases to 0 (zero), and an area (D) where the negative limit value of the input correction value gradually increases to 0 (zero). By performing such limiter processing, correction of image data by the noise reduction processing is not performed more than necessary, whereby the image can be prevented from becoming unnatural. The limiter processing is also effective in enhancement processing.

As described above, in the image processing apparatus of the seventh embodiment, the image quality adjusting circuit 54c is provided with the line memory unit 1, the delay circuit unit 2, the filter processing circuits 7 to 10, the nonlinear processing circuits 16d to 19d, and the adder 24b. In the image quality adjusting circuit 54c, the filter processing is performed on inputted image data in the horizontal, vertical, down-right, and down-left directions. After the filter processing, the noise reduction processing is performed in the horizontal, vertical, down-right, and down-left directions in such a manner that the noise reduction processing correction value is made larger in an area where the luminance value of the input luminance signal is lower, and the sign of the output correction value is inverted in an area where the input correction value is low.

Accordingly, edge smoothing and noise reduction for a dark portion of an image can be enhanced and the edge contrast of a bright portion of the image can be enhanced.

Figure 34:
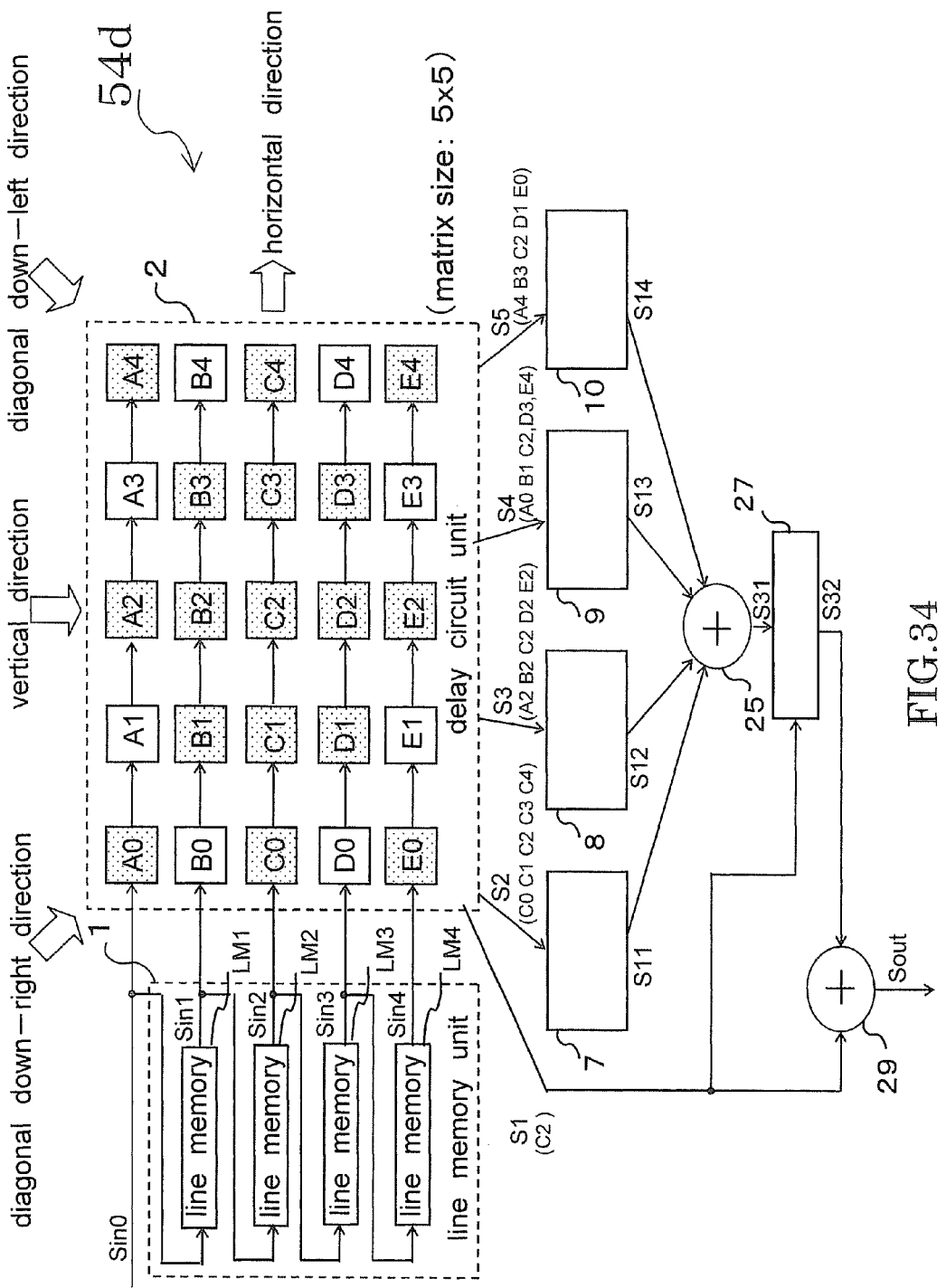
FIG. 34 is a block diagram showing a configuration of an image quality adjusting circuit according to an eighth embodiment of the invention.

An image processing apparatus according to an eighth embodiment of the invention is described with reference to the drawing. FIG. 34 is a block diagram showing a configuration of an image quality adjusting circuit. In the eighth embodiment, the configuration of the image quality adjusting circuit is simplified.

In the following, the same components as those of the fourth embodiment are denoted by the same reference numerals. The description of the same components is omitted, and only different components are described.

As shown in FIG. 34, an image quality adjusting circuit 54d is provided with a line memory unit 1, a delay circuit unit 2, filter processing circuits 7 to 10, a nonlinear processing circuit 27, an adder 25, and an adder 29. Though the delay circuit unit 2 has a 5×5 matrix configuration, the configuration may be changed to an m×n (where m and n are integers not less than 3) matrix form as appropriate. The image quality adjusting circuit 54d has a reduced number (from 4 to 1) of nonlinear processing circuits compared with that of the fourth embodiment. Thus, the configuration of the circuit is simplified.

Edge correction processing is performed by the line memory unit 1, the delay circuit unit 2, the filter processing circuits 7 to 10, the nonlinear processing circuit 27, the adder 25, and the adder 29. Specifically, filter processing is performed on inputted image data, and then coring processing is performed in such a manner that a coring value is varied according to the luminance value of an input luminance signal and an output value is set to 0 (zero) depending on an input signal (a filter processing signal).

The adder 25 is provided between the filter processing circuits 7 to 10 and the nonlinear processing circuit 27. The adder 25 receives filter processing signals S11 to S14. The adder 25 performs addition on the filter-processed image data and outputs an addition processing signal S31 to the nonlinear processing circuit 27.

The nonlinear processing circuit 27 is provided between the adder 25 and the adder 29. The nonlinear processing circuit 27 receives the addition processing signal S31 and an image data signal S1 of a focus pixel (the pixel of a delay circuit C2). The nonlinear processing circuit 27 performs coring processing on the filter-processed image data, and outputs a nonlinear processing signal S32 to the adder 29.

The adder 29 receives the image data signal S1 of the focus pixel (the pixel of the delay circuit C2), and the nonlinear processing signal S32 subjected to the filter processing and the coring processing. The adder 29 performs addition of the image data on the focus pixel and the image data subjected to the filter processing and the coring processing. Consequently, edge-corrected image data obtained by the enhancement processing is outputted from the adder 29.

Here, the coring processing is performed in the nonlinear processing circuit 27; however, noise reduction processing may alternatively be performed. Similarly to the seventh embodiment, limiter processing may be additionally performed.

As described above, in the image processing apparatus of the eighth embodiment, the image quality adjusting circuit 54d is provided with the line memory unit 1, the delay circuit unit 2, the filter processing circuits 7 to 10, the nonlinear processing circuit 27, the adder 25, and the adder 29. In the image quality adjusting circuit 54d, the filter processing is performed on inputted image data in the horizontal, vertical, down-right, and down-left directions, and then the coring processing is performed in the horizontal, vertical, down-right, and down-left directions in such a manner that a coring value is varied according to the luminance value of an input luminance signal and an output value is set to 0 (zero) depending on an input signal.

Thus, in addition to similar effects to those of the fourth embodiment, more simplified circuit configuration than that of the fourth embodiment can be achieved, whereby an inexpensive image quality processing apparatus can be provided.

The invention is not limited to the above-mentioned embodiments, and various modifications may be made without departing from the spirit of the invention.

Image processing apparatuses of the second to eighth embodiments are used for a car-mounted rearview monitor, a vehicle-installed surrounding monitor, and a surveillance camera, for example.

What is claimed is:

1. An image processing apparatus for edge correction processing, comprising:
   a delay circuit unit to receive image signals directly or via line memories, the delay circuit unit having delay circuits arranged in an m×n matrix form (where m and n are integers not less than 3);
   a first filter processing circuit to receive image data signals lying in a horizontal direction of the delay circuit unit, and to generate a first filter processing signal by performing filter processing on the received image data lying in the horizontal direction;
   a second filter processing circuit to receive image data signals lying in a vertical direction of the delay circuit unit, and to generate a second filter processing signal by performing filter processing on the received image data lying in the vertical direction;
   a third filter processing circuit to receive image data signals lying in a down-right direction of the delay circuit unit, and to generate a third filter processing signal by performing filter processing on the received image data lying in the down-right direction; and
   a fourth filter processing circuit to receive image data signals lying in a down-left direction of the delay circuit unit, and to generate a fourth filter processing signal by performing filter processing on the received image data lying in the down-left direction, wherein the first to fourth filter processing circuits each include a first to nth filter factor processing circuits and a first adder,
   the first to nth filter factor processing circuits receive n image data signals, respectively, which are a corresponding one of a set of the image data signals lying in the horizontal direction, a set of the image data signals lying in the vertical direction, a set of the image data signals lying in the down-right direction, and a set of the image data signals lying in the down-left direction, and perform weighted processing by using variable values to a corresponding one of a set of the image data signals, respectively, and perform filter processing on the image data pieces received, respectively, and
   the first adder performs addition of the filter processed image data pieces.

2. The image processing apparatus according to claim 1, further comprising a second adder to receive a first image data signal, which is of image data on a focus pixel of the delay circuit unit, and the first to fourth filter processing signals, and to generate an enhancement-processed image by performing addition of the image data on the focus pixel of the delay circuit unit, the filter-processed image data in the horizontal direction, the filter-processed image data in the vertical direction, the filter-processed image data in the down-right direction, and the filter-processed image data in the down-left direction.

3. The image processing apparatus according to claim 1, wherein the delay circuits are each formed of any one of a flip-flop and a logic gate circuit.

4. The image processing apparatus according to claim 1, wherein the line memories are each formed of any one of an SRAM and a shift register.

* * * * *